US010428601B2

(12) United States Patent
Orban

(10) Patent No.: US 10,428,601 B2
(45) Date of Patent: Oct. 1, 2019

(54) PROXIMITY DETECTION BETWEEN TUBULARS FOR BLIND STABBING

(71) Applicant: SCHLUMBERGER TECHNOLOGY CORPORATION, Sugar Land, TX (US)

(72) Inventor: Jacques Orban, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 214 days.

(21) Appl. No.: 15/238,922

(22) Filed: Aug. 17, 2016

(65) Prior Publication Data

US 2017/0159381 A1    Jun. 8, 2017

Related U.S. Application Data

(60) Provisional application No. 62/263,845, filed on Dec. 7, 2015.

(51) Int. Cl.
*E21B 19/16* (2006.01)
*G05B 19/042* (2006.01)

(52) U.S. Cl.
CPC .......... *E21B 19/165* (2013.01); *G05B 19/042* (2013.01); *G05B 2219/45129* (2013.01)

(58) Field of Classification Search
CPC ...... E21B 19/16; E21B 17/028; E21B 17/042; E21B 19/165
See application file for complete search history.

(56) References Cited

U.S. PATENT DOCUMENTS

| 3,822,902 | A | 7/1974 | Maurer et al. | |
|---|---|---|---|---|
| 5,212,885 | A | 5/1993 | Buonodono et al. | |
| 6,591,916 | B1 | 7/2003 | Ayling | |
| 6,803,757 | B2 * | 10/2004 | Slates | G01B 7/001 324/207.12 |
| 8,511,389 | B2 | 8/2013 | Fenton | |
| 2002/0157838 | A1 | 10/2002 | Ayling | |
| 2004/0174163 | A1 * | 9/2004 | Rogers | E21B 19/165 324/228 |
| 2007/0017682 | A1 * | 1/2007 | Abrahamsen | E21B 44/00 166/379 |
| 2007/0240875 | A1 | 10/2007 | Van Riet et al. | |
| 2009/0151934 | A1 * | 6/2009 | Heidecke | E21B 3/02 166/250.01 |
| 2011/0174500 | A1 * | 7/2011 | Davies | E21B 17/023 166/378 |

(Continued)

FOREIGN PATENT DOCUMENTS

WO    2002036928 A1    5/2002

*Primary Examiner* — Caroline N Butcher
(74) *Attorney, Agent, or Firm* — Rachel E. Greene

(57) ABSTRACT

System, method, and apparatus for connecting tubulars, of which the method includes determining an elevation of a drilling device above a rig floor, lowering a first tubular connected to the drilling device toward a second tubular by lowering the drilling device, determining that the first tubular is in proximity to the drill string based at least in part on an elevation of the drilling device, determining that the first tubular is in proximity to the second tubular based at least in part on a magnetic flux or an electrical current applied to the tubular, the second tubular, or both, and connecting the first and second tubulars together.

13 Claims, 17 Drawing Sheets

(56) References Cited

U.S. PATENT DOCUMENTS

| | | |
|---|---|---|
| 2013/0283917 A1 | 10/2013 | Coonrod et al. |
| 2014/0124267 A1 | 5/2014 | Ayling |
| 2014/0202767 A1 | 7/2014 | Feasey |
| 2014/0231073 A1* | 8/2014 | Teodorescu ............. E21B 31/20 166/250.01 |
| 2014/0262510 A1 | 9/2014 | Beddoes et al. |
| 2015/0191977 A1 | 7/2015 | Skjaerseth et al. |
| 2016/0002984 A1* | 1/2016 | Grice ................... E21B 17/028 166/377 |

\* cited by examiner

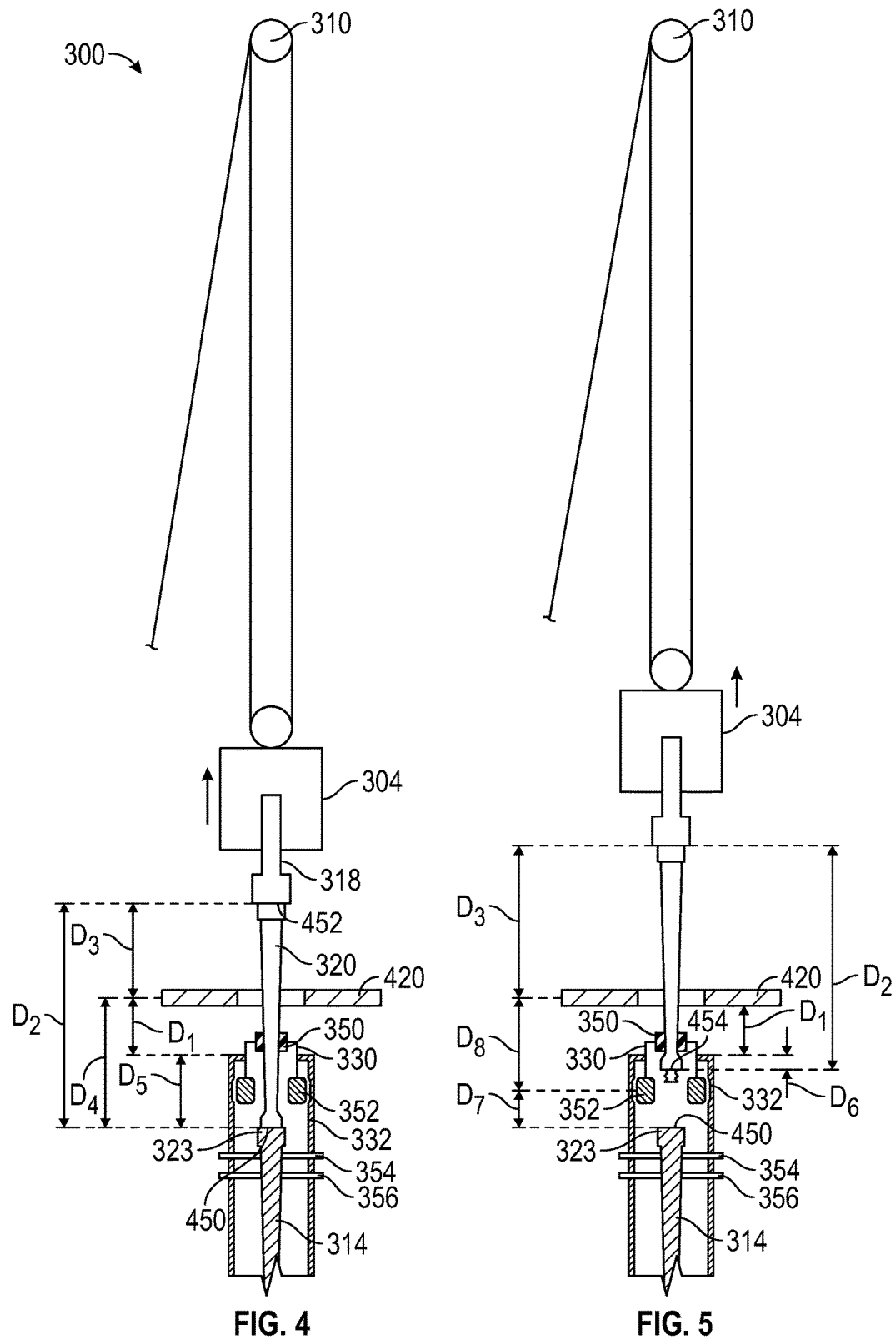

1300

1302 Obtain a first distance between a lower connection of a drilling device and a rig floor

1304 Obtain a length of a new stand of tubulars

1306 Determine a second distance between a upper connection of the new stand and the rig floor

1308 Lower the drilling device until the first distance approaches the second distance

1310 Generate a magnetic flux in an upper tubular of the drilling device

1312 Monitor a current in the new stand generated by the magnetic flux

1314 Electrically connect the tubular of the drilling device with a first electrical contact

1316 Electrically connect the new stand with a second contact

1318 Monitor the tubular, the new stand, or both for an electrical current

FIG. 13

PROXIMITY DETECTION BETWEEN TUBULARS FOR BLIND STABBING

CROSS-REFERENCE TO RELATED APPLICATIONS

This application claims priority to U.S. Provisional Patent Application having Ser. No. 62/263,845, which was filed on Dec. 7, 2015 and is incorporated herein by reference in its entirety.

BACKGROUND

During drilling operations, drilling mud may be pumped into the wellbore. The drilling mud may be pumped into the wellbore through the drill string, e.g., through the interior thereof and out of the drill bit at the distal end of the drill string, and then circulated back through the annulus between the wellbore and the drill string. The drilling mud may serve several purposes, including applying a pressure on the formation, which may reduce or prevent formation fluids from entering the wellbore during drilling. When flowing upwards in the annulus, the drilling mud may remove drill cuttings, reduce friction, etc., which may facilitate the drilling process.

During the drilling process, some connections at the top of the drill string may be broken, to add or remove tubulars in the drill string. During such process, the threads of two successive tubulars are engaged and rotated for full thread engagement. Then torque is applied across the engaged threaded connection. The engagement of the thread may be performed smoothly to avoid damaging the edge of the threads, which may initially enter in contact when approaching the two tubulars. In many drilling rig applications, the driller ensures that the two tubulars are engaged at low axial speed, while the weight of the upper tubular may be supported by the first contact point. Normally, such process minimizes the probability of thread damage. When possible, the driller visually observes the connection to control the process.

In some cases, such visual control may be obstructed or otherwise present challenges. For example, when the engaging the top-drive quill (or a saver sub) with the top of the pipe (or stand), the driller may not have a clear view of the engagement, as the connection may be made at an elevation (e.g., about 30 m) above the rig floor. In other applications, the thread engagement may be performed below the rig floor, e.g., in case of fishing job, which may also limit the visibility of the connection to the operator.

Moreover, when the connection between two pipes, or between the top drive and a pipe, is broken during trip-in or trip-out, the pumping of mud generally ceases while a new connection is made. Stopping the mud flow may allow formation fluid to enter the wellbore as the total wellbore pressure is lowered, which in turn increases risks of fire or explosion at the surface, and may also affect wellbore stability. Further, cuttings may settle in the annulus between the drill string and the wellbore, which may increase the risk of stuck-pipe. Additionally, the filter cake at the wellbore wall may be affected, risking additional invasion in some formations, which may reduce productivity along the reservoir, as well as create a risk for wellbore instability. In addition, gas pressure may rise when the mud no longer circulates through the drill string.

SUMMARY

Embodiments of the disclosure may provide a method for connecting tubulars. The method includes determining an elevation of a drilling device above a rig floor, lowering a first tubular connected to the drilling device toward a second tubular by lowering the drilling device, determining that the first tubular is in proximity to the drill string based at least in part on an elevation of the drilling device, determining that the first tubular is in proximity to the second tubular based at least in part on a magnetic flux or an electrical current applied to the tubular, the second tubular, or both, and connecting the first and second tubulars together.

Embodiments of the disclosure may also provide a drilling system. The drilling system includes a rig floor, a drilling device that is movable vertically with respect to the rig floor, a first proximity detection system configured to determine a proximity of a first tubular coupled to the drilling device to a second tubular based on an elevation of the drilling device above the rig floor, and a second proximity detection system configured to further determine the proximity of the first tubular to the second tubular based on a magnetic flux generated in the first tubular, the second tubular, or both.

Embodiments of the disclosure may further provide an apparatus for connecting together two tubulars in a drilling system. The apparatus includes a drilling device configured to rotate a first tubular, a support device configured to support a second tubular, wherein the drilling device is configured to lower the first tubular toward the second tubular, and then to rotate the first tubular with respect to the second tubular, to connect the first and second tubulars together, a first proximity detection system configured to determine a proximity of the first tubular to the second tubular based on an elevation of the drilling device, a second proximity detection system configured to determine the proximity of the first tubular to the second tubular based on a magnetic flux in the first tubular, the second tubular, or both, and a third proximity detection system configured to determine that the first tubular has engaged the second tubular based on an electrical current in the first tubular, the second tubular, or both.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 4, 5, 6, 7, and 8 illustrate a sequence of operation of the drilling rig in which proximity between an upper tubular and the drill string is determined based on the position of the drilling device, according to an embodiment.

FIG. 13 illustrates a flowchart of a method for connecting tubulars together, e.g., above the rig floor, according to an embodiment.

DETAILED DESCRIPTION

Figure 1:
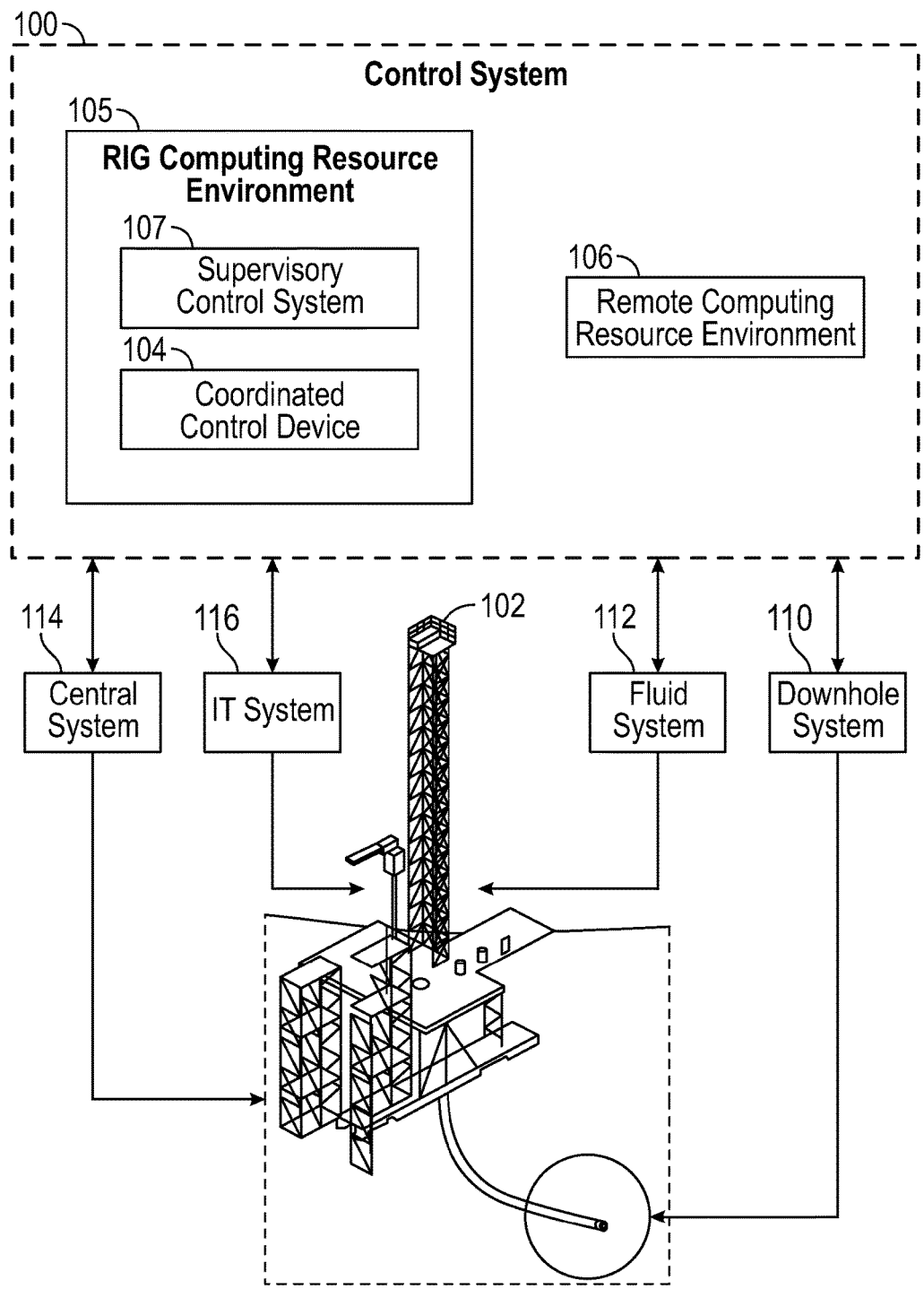
FIG. 1 illustrates a schematic view of a drilling rig and a control system, according to an embodiment.

In general, embodiments of the present disclosure may provide one or more systems and methods for facilitating the connection of two tubulars (e.g., an "upper" tubular such as a quill, quill extension, or a new stand of tubulars, and the drill string) without (or with reduced) visual inspection. In one application, such connection process may have to be performed below the rig floor, for example, within the blowout preventer. In another application, such connection process may be performed at an elevation above the rig floor. A first system may employ the elevation of the drilling device from the rig floor (e.g., the "hook position") to establish a relative positioning of the drill string within the blowout preventer, and may lower the upper tubular until, based on the elevation of the drilling device, it is determined that the upper tubular is in proximity to the drill string. A second system may generate and measure magnetic flux travelling between the upper tubular and the drill string, to infer a gap distance therebetween. A third system may generate an electric current in the drill string and/or in the upper tubular when contact therebetween is made, e.g., by using the drill string and the upper tubular as contacts in an electric circuit. These and other aspects will be described in greater detail below.

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection). In some embodiments, the remote computing resource environment 106 may be at least partially located onsite, e.g., allowing control of various aspects of the drilling rig 102 onsite through the remote computing resource environment 106 (e.g., via mobile devices). Accordingly, "remote" should not be limited to any particular distance away from the drilling rig 102.

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. These systems 110, 112, 114 may also be examples of "subsystems" of the drilling rig 102, as described herein. In some embodiments, the drilling rig 102 may include an information technology (IT) system 116. The downhole system 110 may include, for example, a bottomhole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, safety concerns for different control systems, etc.). An embodiment of the control system 100 that is unified, may, however, provide control over the drilling rig 102 and its related systems (e.g., the downhole system 110, fluid system 112, and/or central system 114, etc.). Further, the downhole system 110 may include one or a plurality of downhole systems. Likewise, fluid system 112, and central system 114 may contain one or a plurality of fluid systems and central systems, respectively.

In addition, the coordinated control device 104 may interact with the user device(s) (e.g., human-machine interface(s)) 118, 120. For example, the coordinated control device 104 may receive commands from the user devices 118, 120 and may execute the commands using two or more of the rig systems 110, 112, 114, e.g., such that the operation of the two or more rig systems 110, 112, 114 act in concert and/or off-design conditions in the rig systems 110, 112, 114 may be avoided.

Figure 2:
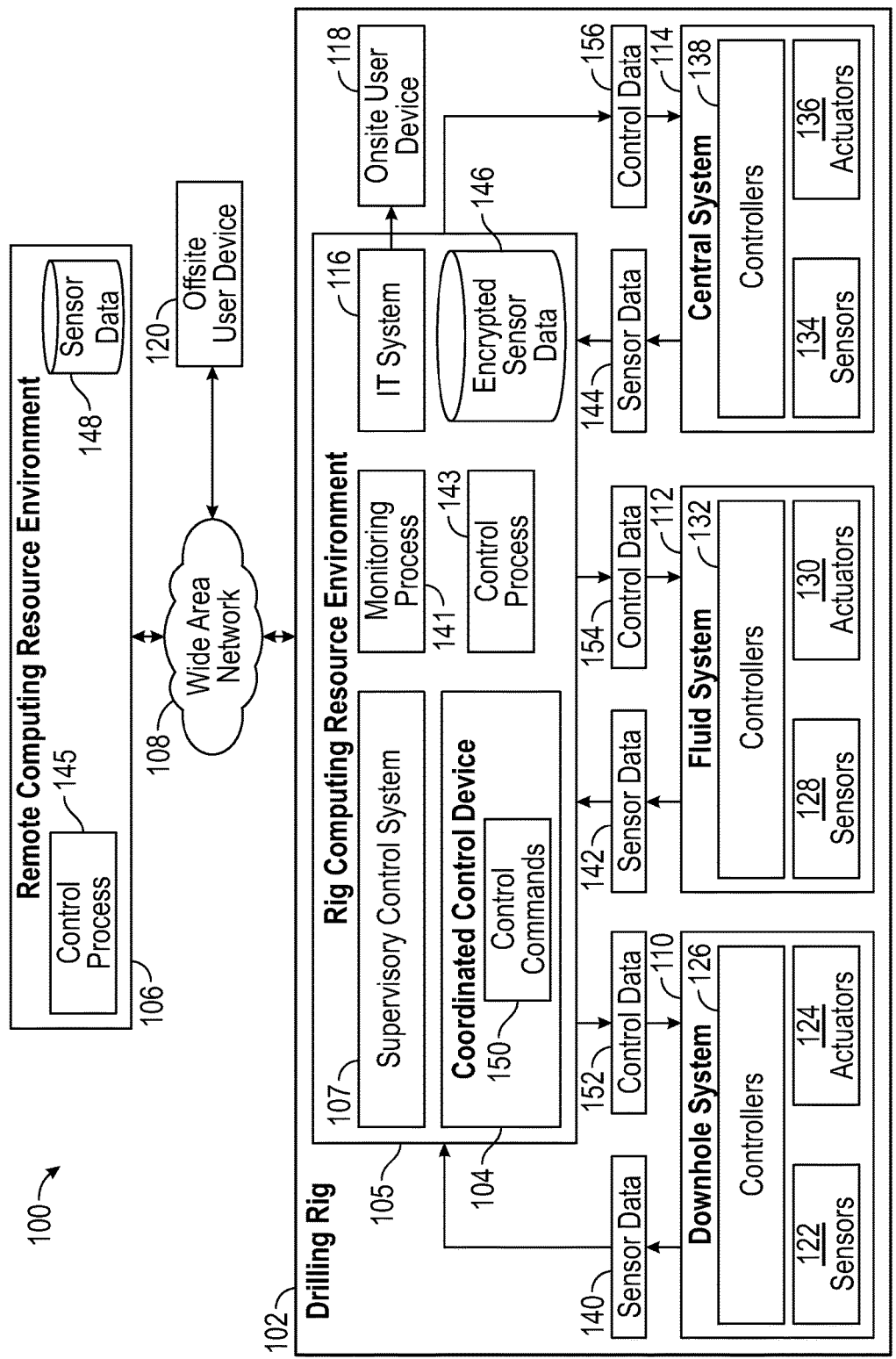
FIG. 2 illustrates a schematic view of a drilling rig and a remote computing resource environment, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The user devices 118 and/or 120 may be examples of a human-machine interface. These devices 118, 120 may allow feedback from the various rig subsystems to be displayed and allow commands to be entered by the user. In various embodiments, such human-machine interfaces may be onsite or offsite, or both.

The systems of the drilling rig 102 may include various sensors, actuators, and controllers (e.g., programmable logic controllers (PLCs)), which may provide feedback for use in the rig computing resource environment 105. For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data feedback to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data into the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. In yet another embodiment, measurements of the same physical properties using different sensors may provide information about the relative quality of each measurement, resulting in a "higher" quality measurement being used for rig control, and process applications. The variation in measurements at different locations over time may be used to determine equipment performance, system performance, scheduled maintenance due dates, and the like. Furthermore, aggregating sensor data from each subsystem into a centralized environment may enhance drilling process and efficiency. For example, slip status (e.g., in or out) may be acquired from the sensors and provided to the rig computing resource environment 105, which may be used to define a rig state for automated control. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands. Furthermore, for mode based controllers which employ complex computation to reach a control setpoint, which are typically not implemented in the subsystem PLC controllers due to complexity and high computing power demands, the coordinated control device 104 may provide the adequate computing environment for implementing these controllers.

In some embodiments, control of the various systems of the drilling rig 102 may be provided via a multi-tier (e.g., three-tier) control system that includes a first tier of the controllers 126, 132, and 138, a second tier of the coordinated control device 104, and a third tier of the supervisory control system 107. The first tier of the controllers may be responsible for safety critical control operation, or fast loop feedback control. The second tier of the controllers may be responsible for coordinated controls of multiple equipment or subsystems, and/or responsible for complex model based controllers. The third tier of the controllers may be responsible for high level task planning, such as to command the rig system to maintain certain bottom hole pressure. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The sensor data 140, 142, 144 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a client (e.g., a thin client) configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. Furthermore, the monitoring process 141 may monitor sensor data and determine the quality of one or a plurality of sensor data. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. The virtual computing system and/or computers may provide a human-machine interface through which a user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Figure 3:
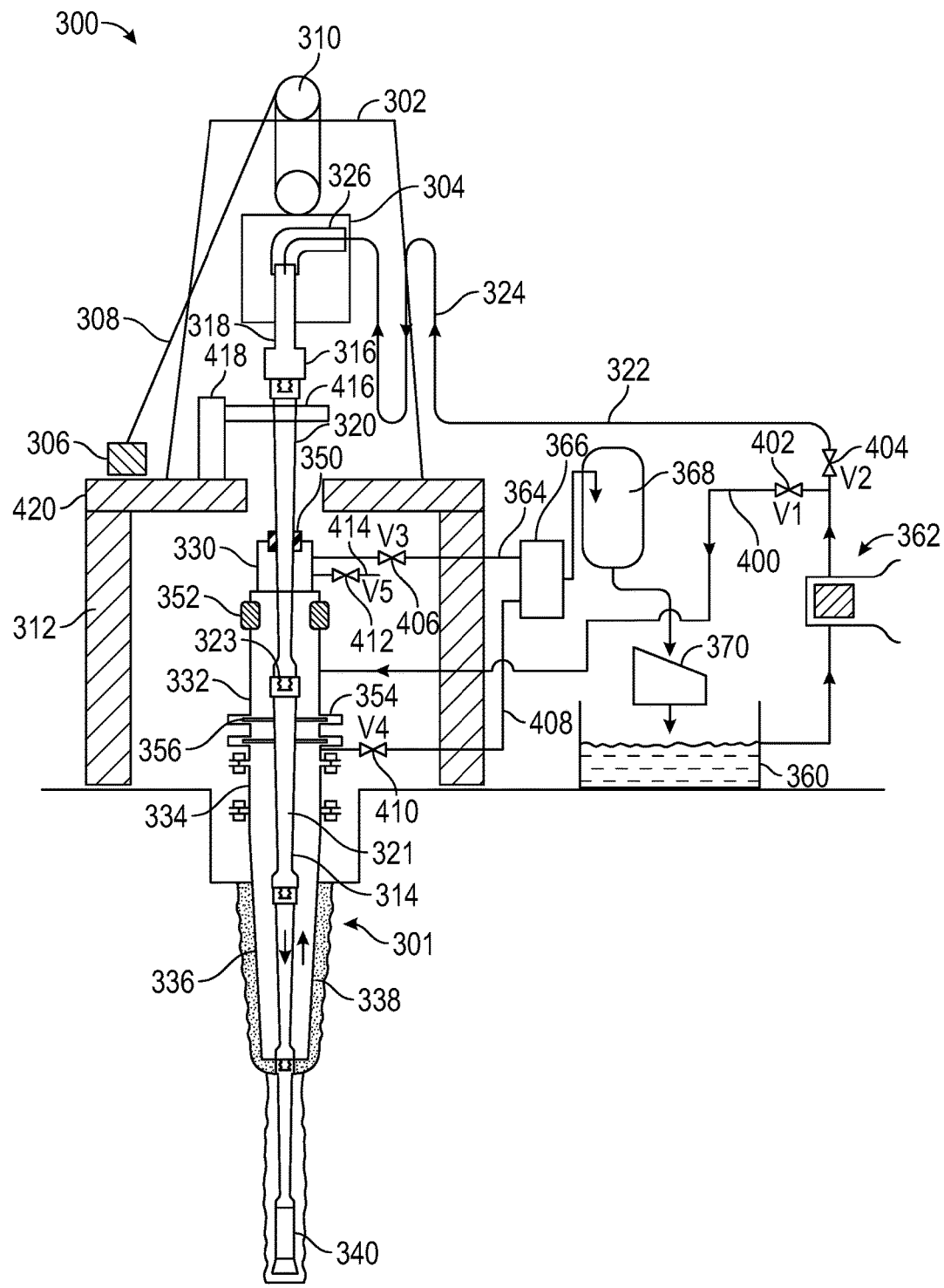
FIG. 3 illustrates a schematic view of a drilling rig configured for continuous mud circulation, according to an embodiment.

FIG. 3 illustrates a conceptual, schematic view of a drilling system 300, according to an embodiment. The drilling system 300 may be located partially above and partially within a wellbore 301, as shown, e.g., after drilling operations have commenced. The drilling system 300 may include a mast 302 from which a top drive 304 (or another tubular-rotating and/or tubular-supporting, "drilling device") is movably supported. For example, the top drive 304 may be raised and lowered along the mast 302 using a drawworks 306 coupled to the top drive 304 via a drilling line 308 received through a set of sheaves 310.

The drilling system 300 may also include a rig substructure 312 that may support the mast 302 and the structures coupled therewith. The rig substructure 312 may straddle the wellbore 301. A drill string 314 may be received through an opening in the rig substructure 312 and may extend into the wellbore 301. The drill string 314 may be supported by the top drive 304, e.g., via a connection with a shaft 316 (or "quill") that is rotated by the top drive 304. The shaft 316 may define a neck 318, which may be connected to the box-end connection of an upper-most tubular or "quill extension" 320 of the drill string 314. The quill extension 320 may connect with a next tubular 321 at a connection 323. A mud supply line 322, which may include a standpipe 324, may be coupled to an interior of the shaft 316 via a conduit 326 within the top drive 304. The top drive 304 may rotate the shaft 316, and a rotary seal (not shown) between the conduit 326 and the shaft 316 may retain the pumped fluid inside the bore of the conduit 326 and shaft 316.

The drill string 314 may also be received through a rotating control device ("RCD") 330, a blowout preventer ("BOP") 332, and a wellhead 334. The RCD 330 may be (e.g., releasably) coupled to the BOP 332 and positioned above the BOP 332, as shown, such that the BOP 332 is positioned between the RCD 330 and the wellhead 334. The wellhead 334 is attached to the top of a casing 336 that extends in a portion of the wellbore 301. The casing 336 may be cemented into the wellbore 301, forming a cement layer 338. The drill string 314 may extend into the wellbore 301. The drill string 314 may extend to its distal terminus, where a bottom hole assembly ("BHA") 340, e.g., including a drill bit, may be located.

The RCD 330 may include an RCD seal 350, e.g., at or toward the top thereof, so as to provide a fluid-tight seal with the drill string 314 while the drill string 314 may be rotated and moved axially in the RCD 330. Accordingly, the RCD 330 may provide a sealable chamber below the rig floor 420. The BOP 332 may include an elastomeric annular body or seal, which may be referred to as a BOP annular preventer or, more succinctly, a BOP annular 352. The BOP annular 352 may be selectively opened and closed, such that a seal is formed with the drill string 314 when the BOP annular 352 is closed. The BOP 332 may thus also provide a sealable chamber therein, which may contain an open connection of the drill string 314 and in which connections may be made with the open connection of the drill string 314.

The BOP 332 may also include one or more pipe support devices, which are any structures configured to bear the weight of the drill string 314. In an embodiment, the pipe support devices may include a pipe ram 354 specifically designed for cyclic use as part of the drilling process, e.g., the pipe ram 354 is designed for use in "many-cycles." The BOP 332 may also include a tubular lock 356. The tubular lock 356 may be operated in similar way as a pipe ram. When activated the tubular lock 356 may support the weight of the tubular passing through the BOP 332, including the weight of the drill string 314 connected thereto. The tubular lock 356 may also lock the tubular in rotation, allowing make-up torque to be applied to a new tubular to be added in the drill string 322, as well as un-torquing an above tubular from the locked string 314.

The pipe ram 354 and the tubular lock 356 may both be positioned below the BOP annular 352, i.e., within the BOP 332. The relative position of the pipe ram 354 and tubular lock 356 may be as shown, with the pipe ram 354 vertically above the tubular lock 356, or may be reversed. The pipe ram 354 may be configured to seal the annulus between the BOP 332 and the drill string 314, and the tubular lock may be configured to prevent the drill string 314 from rotating, when engaged. Further, either or both of the pipe ram 354 and the tubular lock 356 may be employed to support the weight of the drill string 314 within the wellbore 301. Moreover, the BOP 332 may be coupled to or otherwise positioned above (e.g., directly above) the wellhead 334. Additional details for an embodiment of the pipe ram 354 are described below.

During drilling operations, a fluid or slurry "drilling mud" is provided into the wellbore 301 through the drill string 314, e.g., to remove cuttings, maintain bottom hole pressure, reduce friction between the drill string 314 and the wellbore 301, etc. The mud may be provided from a pit (or tank) 360, and may be pumped through the mud supply line 322 via a pump 362. The pump 362 may be referred to as a mud triplex, as it may be provided by a three-piston pump; however, any suitable type of pump may be employed. In the illustrated embodiment, the mud pumped through the mud supply line 322 is delivered through the conduit 326 of the top drive 304, the shaft 316, the drill string 314, and the BHA 340, to the distal end of the wellbore 301. The mud then circulates back up through the wellbore 301, through the casing 336, the BOP 332, and the RCD 330.

The drilling system 300 may include a flow line 364, which may receive the mud from the RCD 330, and deliver the mud to a choke 366, which may be employed, e.g., to manage pressure during drilling (e.g., as part of a managed pressure drilling (MPD) operation). From the choke 366, the mud may be delivered to a mud-gas separator ("MGS") 368, which may remove gases therefrom. From the MGS 368, the mud may be delivered to a shale shaker 370, which removes particulates therefrom, and finally may be delivered back to the mud pit 360. This may be the primary flowpath for the drilling mud, e.g., through the top drive 304 and the drill string 314, into the wellbore 301, and out through the BOP 332 and the RCD 330. The flow of drilling mud through this flowpath may be referred to as a "first" flow of the drilling mud.

The drilling system 300 may also provide a secondary flowpath through which a second flow of fluid may proceed. For example, in the illustrated embodiment, the drilling system 300 includes a second or "alternate" mud supply line 400, which may extend from the mud supply line 322 to the BOP 332, below the BOP annular 352. A first valve (V1) 402 may be disposed in the alternate mud supply line 400. When open, the first valve 402 may divert mud from the mud supply line 322, and deliver it directly to the BOP 332. Moreover, the mud supply line 322 may include a second valve (V2) 404, which may, for example, be closed to block mud flow to the top drive 304 via the mud supply line 322. Similarly, the flow line 364 may include a third valve (V3) 406 configured to open and close, allowing and blocking, respectively, mud flow from the RCD 330 to the choke 366.

The drilling system 300 may also include a second or "alternate" flow line 408, which may extend from the BOP 332 to the choke 366. For example, the alternate flow line 408 may extend from a position below the pipe ram 354. The alternate flow line 408 may also include a fourth valve (V4) 410, which may open and close to allow and prevent, respectively, a mud flow from the BOP 332 directly to the choke 366. The drilling system 300 may further include a bleed line 414, which may include a fifth valve (V5) 412 that is similarly operable with respect to the bleed line 414, and may be employed to relieve pressure in the RCD 330 when the BOP annular 352 is closed. In various embodiments, the bleed line 414 may be connected to the choke 366, the MGS 368, or the mud pit 360. The second flow of drilling mud may thus employ these alternate lines 400, 408, and may be delivered to and received directly from the BOP 332.

The drilling system 300 may further include an RCD seal locator 416 and an actuator 418 positioned at or above a rig floor 420 of the rig substructure 312. The RCD seal locator 416 may be configured to move with and/or apply a moving force, e.g., via the actuator 418, to the RCD 330 or a part thereof. Accordingly, the RCD seal locator 416 may be configured to maintain the RCD seal 350 at a chosen position above the rig floor 420 while the RCD seal 350 is still on the shaft 316 or on the extension 320.

By provision of the two mud flowpaths and the two sealed chambers (one in the RCD 330 and one in the BOP 332), the drilling system 300 may be configured to provide for continuous mud circulation through the BOP 332. When the top drive 304 (or other drilling device) is attached to the drill string 314, mud may be delivered via the mud supply line 322, through the top drive 304, and into the drill string 314. When a connection between two pipes of the drill string 314 is broken within the BOP 332, fluid may flow via the alternate flow line 408 into the BOP 332 and into the well via the remaining drill string 314. Accordingly, in the drilling system 300, connections with the drill string 314 may be made up and broken apart within the BOP 332, e.g., within the sealable chamber provided by the BOP 332.

FIG. 4 illustrates a schematic view of the drilling system 300, showing several distances that may be determined as part of a first proximity detection system, to facilitate connecting tubulars below the rig floor 420, according to an embodiment. As noted above, the connection between the tubulars may be made within a sealable chamber residing below the rig floor 420, e.g., within the BOP 332, to name just one example. In other embodiments, the connection may be made elsewhere (e.g., above the rig floor), and may be facilitated by the first proximity detection system.

The first proximity detection system may include one or more devices configured to detect an elevation of the top drive 304 (or any other drilling device) from the rig floor 420, for example, an encoder contained in the drawworks 306. Further, the first proximity detection system may include a processing device configured to store distances that are measured, specified, or otherwise obtained as part of the drilling environment, and to determine other distances based on the obtained measurements and the elevation of the top drive 304, as will be described below.

In at least one embodiment, the first proximity detection system may store a first distance D1 between a reference point of the RCD 330 and the rig floor 420 when the RCD 330 is attached to the BOP 332, as shown in FIG. 4. More specifically, the first distance D1 may be the distance between where the RCD 330 connects to the BOP 332 and the rig floor 420. The BOP 332 is generally stationary with respect to the earth and the rig floor 420. Accordingly, the distance D1 between the RCD 330 and the rig floor 420 may be a static dimension of the system 300.

The first proximity detection system may also store a second distance D2, which may be the length of the quill extension 320. The distance D2 may be obtained by direct measurement of the quill extension 320, and may be a static dimension. Further, the upper connection 323 of the drill string 314 may have a top surface 450, and the quill shaft 316 may have a lower face 452. When the quill extension 320 is connected to the drill string 314, as shown in FIG. 4, the second distance D2 may represent the distance between the top surface 450 and the lower face 452.

The first proximity detection system may also determine a third distance D3 between the rig floor 420 and the lower face 452 of the quill shaft 316. The third distance D3 may be determined based on a measurement of the elevation of the top drive 304 from the rig floor 420 (sometimes referred to as the "hook position"), and a measurement of the length of the quill shaft 316, which may be a static dimension. The distance D3 thus may include additions or subtractions of static dimensions (e.g., dimensions of the top drive 304) to or from the tracked elevation of the top drive 304; however, the distance D3 may be referred to herein as the elevation of the top drive 304, while continuing to take into consideration such additions and/or subtractions.

With the distances D2 and D3 determined, the first proximity detection system may determine a fourth distance D4, between the rig floor 420 and the lower face 452 of the extension 320. The fourth distance D4 may be calculated as the difference between the distances D2 and D3. When the extension 320 is connected to the drill string 314, the fourth distance D4 may also be the distance between the drill string 314 and the rig floor 420, thus establishing a location of the drill string 314 within the BOP 332. The location of the drill string 314 in the BOP 332 (e.g., within the sealable chamber provided thereby) may be determined based on the distances D2 and D3, rather than by direct measurement, because the drill string 314 may be difficult to access within the BOP 332. Further, the location of the drill string 314 relative to the rig floor 420, when supported by the lock system such as pipe ram 354, may vary slightly during a single tripping-in or tripping-out process, e.g., depending on the geometry of the drill pipe in the drill string 314, slight differences in where the pipe ram 354 engages the drill string 314, and the like.

In addition, the first proximity detection system may determine a fifth distance D5 between the drill string 314 and where the RCD 330 connects to the BOP 332. The fifth distance D5 may be the difference between the fourth distance D4 and the first distance D1. The overall distance between the top drive 304 and the top surface 450 of the drill string 314 may thus be determinable by the first proximity detection system based on the distances D1, D2, D3, and D5 (e.g., D2=D3+D1+D5), despite the top surface 450 of the drill string 314 being located within the BOP 332.

FIG. 5 illustrates the next stage in a sequence of tripping-in a new drill pipe stand into the wellbore using the first proximity detection system, according to an embodiment. At this point, the extension 320 has been disconnected from the drill string 314, and the top drive 304 has been raised (i.e., the third distance D3 has increased from FIG. 4). As such, the extension 320 has been raised relative to the drill string 314, and now the extension 320 resides entirely above the BOP annular 352. The RCD 330 remains coupled to the BOP 332. In this position, the BOP annular 352 may be closed, sealing the well, without the extension 320 interfering with the closing of the BOP annular 352, and thereafter, the RCD 330 may be decoupled from the BOP 332. The lower end of the extension 320 may extend past the connection point between the RCD 330 by a sixth distance D6 (e.g., D6=D2−D3−D1).

In order to ensure that the lower extent of the extension 320 is above the BOP annular 352, the third distance D3 may be increased between FIGS. 4 and 5 by at least a seventh distance D7 between the top surface 450 and the BOP annular 352. The first proximity detection system may determine the seventh distance D7 based on an eighth distance D8 between the rig floor 420 and the BOP annular 352, which may be a static dimension of the system 300. In particular, the seventh distance D7 may be the difference between the fourth distance D4 and the eighth distance D8.

Figure 6:
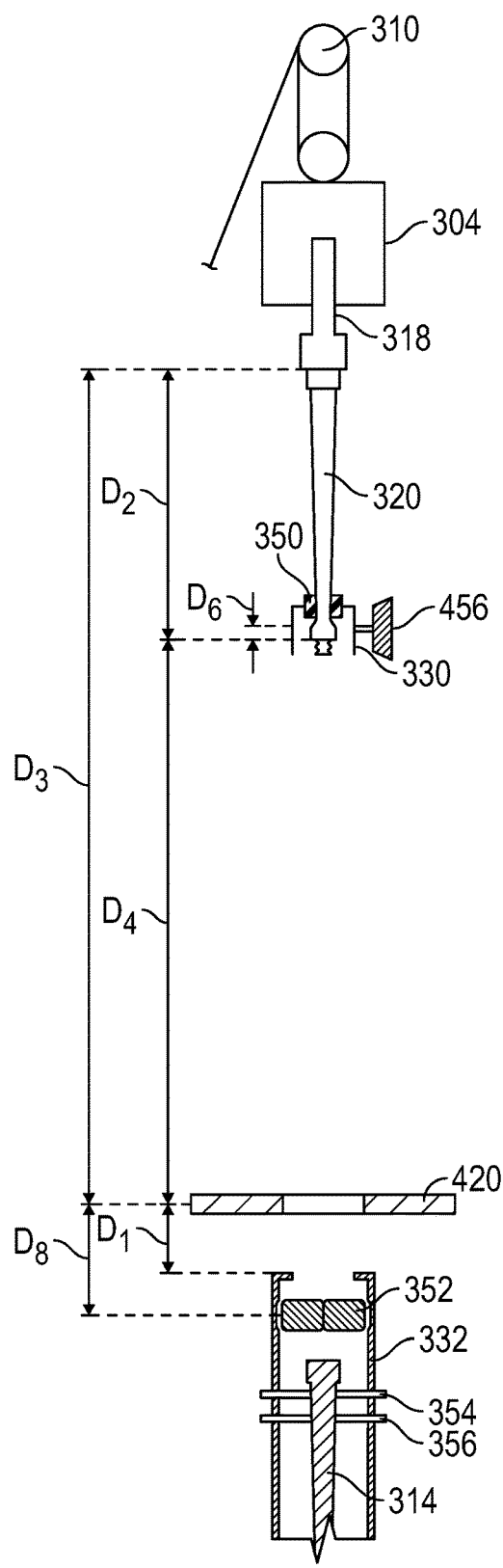

Proceeding to FIG. 6, the BOP annular 352 may be closed (prior to decoupling the RCD 330 from the BOP 332), and the top drive 304 may be raised (the third distance D3 increases), such that the RCD 330 is lifted away from the BOP 332, and the extension 320 and the RCD 330 are lifted up through the rig floor 420. The RCD 330 may be moved by interaction with the extension 320, and an RCD dragging device 456 may be moved along with the RCD 330 on its upward travel, above the rig floor 420.

Figure 7:
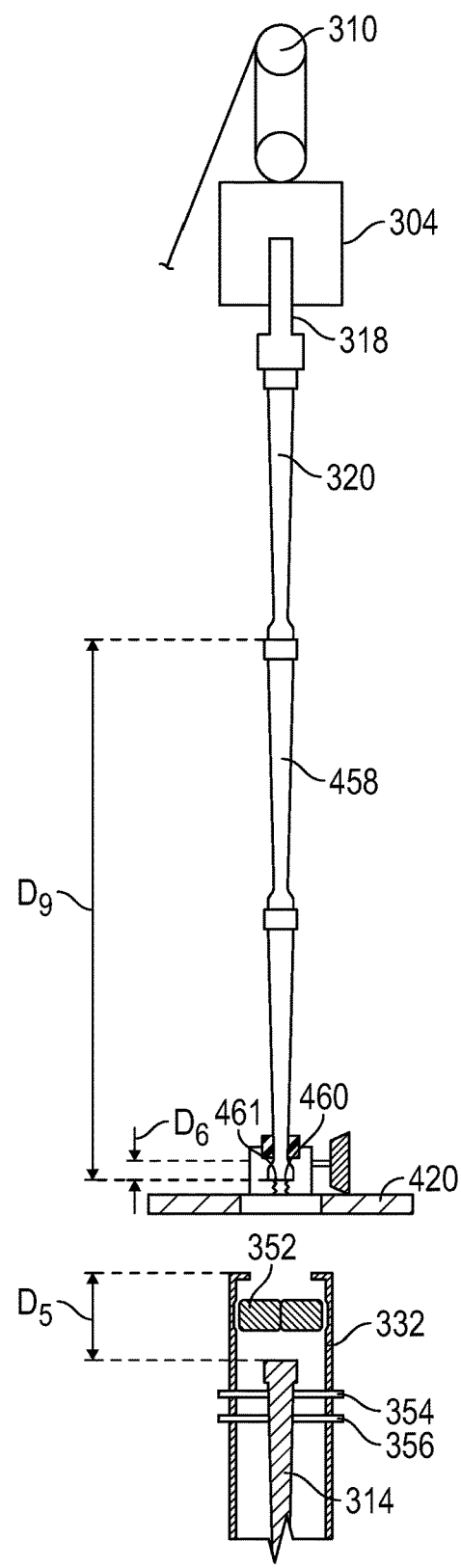

Referring to FIG. 7, once the fourth distance D4 (lower extent of extension 320 to rig floor 420) is large enough, a new stand 458 of one or more (e.g., two, as shown) tubulars may be attached to the extension 320. A ninth distance D9 may be the length of the new stand 458, which may be slightly less than the distance D4 when then new stand 458 is added. The dragging device 456 may operate to move the RCD 330 downwards, toward the rig floor 420, such that the RCD 330 is received over a lower connection 461 and extends past a lower face 460 of the new stand 458 by the sixth distance D6. The sixth distance D6 in FIG. 8 may be less than or equal to the sixth distance D6 in FIG. 5, so as to ensure that the RCD 330 engages the BOP 332 without the lower end of the new stand 358 contacting the BOP annular 352.

Figure 8:
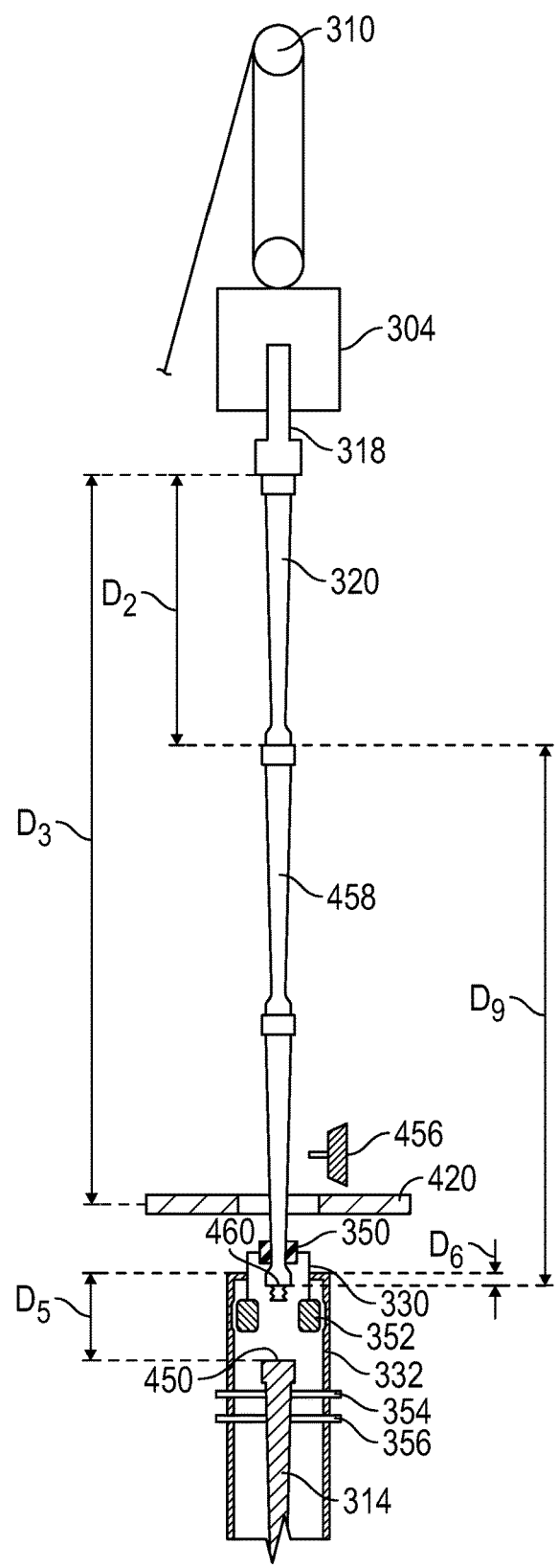

Turning now to FIG. 8, the new stand 458 may be lowered through the rig floor 420 by lowering the top drive 304. The first proximity detection system may determine when the RCD 330 engages the BOP 332 based on the elevation of the top drive 304 (distance D3), the length of the new stand 458 (distance D9), the position of the RCD 330 relative to the lower end of the new stand 458 (distance D6), and the distance D1 between the rig floor 420 and where the RCD 330 connects with the BOP 332. One or more other systems may be provided to ensure proper coupling of the RCD 330 to the BOP 332.

Once the RCD 330 is coupled to the BOP 332, the BOP annular 352 may be opened. Lowering the top drive 304 may pause while the BOP annular 352 is opened, so as to avoid the lower end of the new stand 458 contacting the BOP annular 352. The top drive 304 may then be further lowered until the lower end 461 of the new stand 458 is proximal to (or in engagement with) the drill string 314, which may be determined based on the elevation of the top drive 304 (distance D3), the length of the new stand 458 (distance D9), and the distance D4 between the rig floor 420 and the top surface 450 of the drill string 314.

It will be appreciated that the sequence described above with reference to FIGS. 4-8 is for tripping-in, i.e., adding a new stand 458 of one or more tubulars to the drill string 314. However, the sequence may be modified for tripping-out operations, in which the extension 320 is raised while in connection with the drill string 314, so as to remove the upper-most stand from the drill string 314. The extension 320 may then be lowered into engagement with the drill string 314 in the BOP 332 based on the elevation of the top drive 304 (distance D3) and with knowledge of at least some of the distances D1, D2, and D4–D9.

Figure 9A:
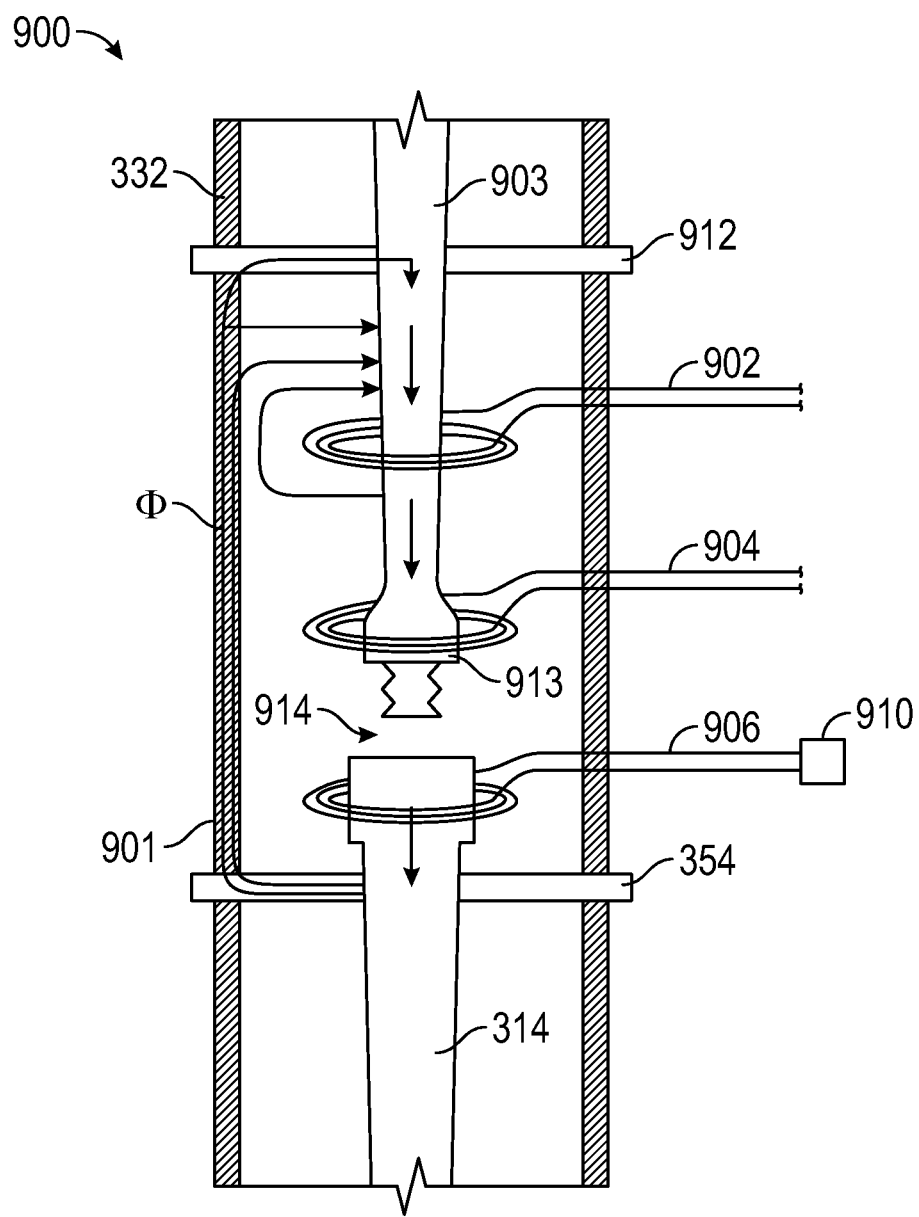
FIG. 9A illustrates a schematic view of a second proximity detection system within a blowout preventer, according to an embodiment.

In some embodiments, this first proximity detection system may provide sufficient information for reliable, safe connection of the tubular within the BOP 332 (or anywhere else where visibility may be low or difficult). In other embodiments, a second proximity detection system, with a higher degree of accuracy may be employed, e.g., in combination with the first proximity detection system, when the new stand 458 or the extension 320 draws near to the drill string 314 in the BOP 332. FIG. 9A illustrates a schematic view of such a second proximity detection system 900, according to an embodiment. The second proximity detection system 900 may include a set of one or more antennae, e.g., three antennae 902, 904, 906. In this embodiment, the antennae 902, 904, 906 may be positioned within a body 901 of the BOP 332. In other embodiments, the antennae 902, 904, 906 may be placed elsewhere, e.g., above the rig floor 420 so as to measure and/or induce flux in one or more tubulars extending therethrough. As shown, two of the antennae 902, 904 may be positioned around an upper tubular 903 (e.g., the extension 320 or the new stand 458), while the antenna 906 may positioned around the drill string 314.

Figure 9B:
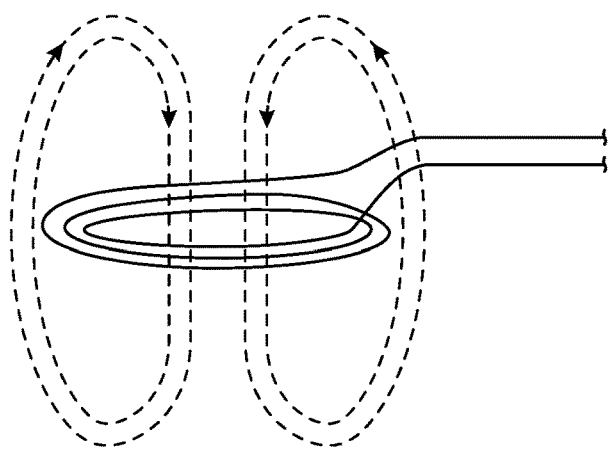
FIG. 9B illustrates a conceptual view of magnetic lines generated by a coil, according to an embodiment.

Any of the antennae 902, 904, 906 may be capable of generating or detecting a magnetic flux in the upper tubular 903 and/or the drill string 314. For example, the antennae 902, 904, 906 may each include a wire wrapped around a ring that is non-conductive and has a low magnetic permeability (e.g., its relative magnetic permeability may be about 1 or close thereto). The ring may, for example, be made of plastic, ceramic, glass fiber, or the like. A current may be passed through the wire, thereby generating a magnetic field crossing the section defined by the wrapped wire. Such magnetic field line may be a closed path as shown in FIG. 9B.

The signal transmission may be described according to the following equations:

$$H=NI, \tag{1}$$

$$\beta=\mu H, \tag{2}$$

$$\Phi=\beta S, \tag{3}$$

where N is the number of turns, H is the magnetic field, I the current in antenna (or wire loop), β is the flux density, Φ is the magnetic flux, μ is magnetic permeability, and S is surface area defined by the wire loop.

Figure 9C:
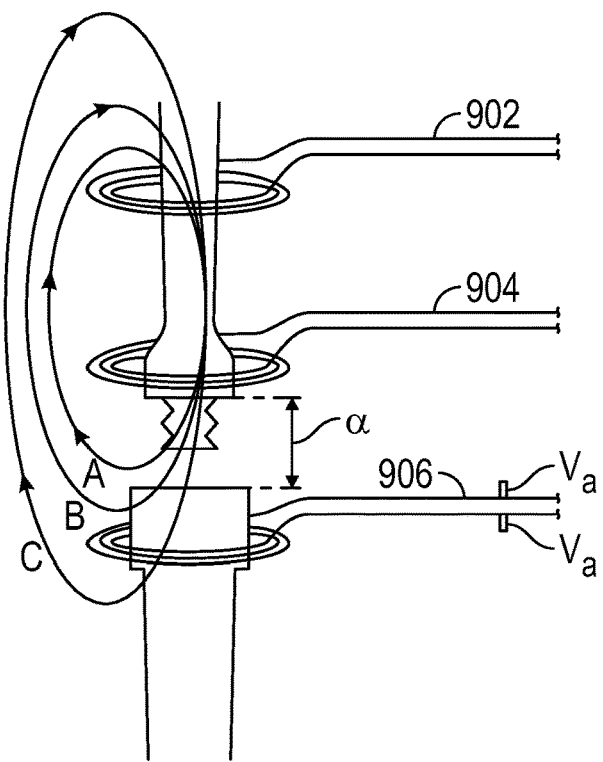
FIG. 9C illustrates a schematic view of the operation of the second proximity detection system, according to an embodiment.

Ferromagnetic material, such as the material of the tubulars, has a high magnetic permeability μ, so that the reluctance of a path containing such material is lower and the magnetic flux will be higher along this path. When high permeability material (such as ferromagnetic metal) is present, the flux line may be established inside these ferromagnetic material. This is shown in FIG. 9C. Any of the antennae 902, 904, 906 may act as a transmitter. The upper antenna 902 may be acting as transmitter. For example, the upper antenna 902 may have a AC current applied thereto so that AC magnetic field is generated. Magnetic flux lines A, B,C are represented as example. AC excitation of the antenna 902 may be employed for embodiments including a receiving antenna, as described by equation (4), below. The magnetic line C passes through the antenna 906 and generate a signal into this antenna 906, as the voltage in this antenna is proportional to variation of flux versus time:

$$V=-K\delta\Phi/\delta t \tag{4}$$

The voltage output is present with AC signal due to the time variation, and thus may not be produced with a DC signal, in at least some embodiments. Magnetic flux Φ is the integration of the flux density β over the area of the antenna. Any of the antenna 902, 904, 906 may be configured to receive and detect the signal.

Along this line, the flux density increases when a distance α(the extent of the gap 914, FIG. 9A) reduces. This means that the output of the antenna 906 would increases with a reduction of the distance α. A similar output response may be seen for the antenna 904, as the flux density of lines B and C increase when the distance α reduces, due to the high magnetic permeability of the drill string 314.

The relative magnetic permeability of ferromagnetic steel of drill string component with respect to the wellbore environment may be in the range of 200 to 1000. Based on the contrast of relative permeability between air and steel, the magnetic flux may be larger when the flux line path is inside or partially inside a ferromagnetic steel, rather than solely in air (or fluid such as water or diesel). Such a situation may occur when making a connection between the quill extension 320 and a stand of pipe 458 as well as connection between drill string 314 and the stand of pipe 458. Such situation may also be applicable when making the connection between a tubular hanging below the top drive 304 and the drill string 314 supported by slips in the rotary table.

When considering the application of a ferromagnetic drill string 314 and tubular 903 inside another ferromagnetic devise, the magnetic flux travels inside the ferromagnetic material (e.g., the drill string 314, extension 320, and either the BOP or the top drive 305). In such situation, the magnetic field present in the upper tubular 903 and the drill string 314 may be larger. Such situation may applied when the device is a BOP, as shown in FIG. 9A.

In an embodiment, the antennae 902, 904 may be "transmitter" coils, which may be fed with AC electric current to generate the AC magnetic field. The flux generated is represented by flux lines, indicated as $\phi$. When ferromagnetic material is present, the magnetic flux may be higher as the magnetic permeability of such materiel is higher than air, water and diesel. This is the case when the upper tubular 903, the drill string 314 and/or the BOP 900 are made of ferromagnetic steel. The flux line $\beta$ will preferably follow a path within these materials. In such case the magnetic flux is also higher. In some embodiments, a single transmitter antenna 902 may be provided associated with two receivers, e.g., coils 904 and 906. In other embodiments, a single transmitter 902 may be used, along with a single receiver, e.g., antenna 906. In another embodiment, a single coil may transmit the flux, and the coil impedance may be measured, so as to allow an inference as to the gap distance $\alpha$. A controller 910 may monitor any of the antennae 902, 904, 906 and may detect the generation of current therein, e.g., via magnetic flux in the drill string 314.

The pipe ram 354, supporting the drill string 314 may, in some embodiments, provide a complementary path for the magnetic flux $\phi$ inside ferromagnetic steel to drain additional magnetic flux into the overall path which may include the BOP body 901. An upper contact 912 toward the top of the BOP 332 may provide an additional path for the flux $\phi$ along ferromagnetic material (such as steel). This upper contact 912 may be another BOP pipe ram or even the RCD body. With such application, the magnetic flux generated by one of the antenna 902, 904, 906 may have a path mostly along ferromagnetic material, such as through the upper tubular 903, the drill string 314, the pipe ram 354, the BOP body 901 and the upper contact 912. The magnetic flux is transmitted across a short gap 914 (FIG. 9A) between the upper tubular and the drill string 314, which is shown as distance d in FIG. 9C). Due to the contrast of magnetic permeability between ferromagnetic material and air (water, diesel, mud), the flux is nearly proportional to this distance $\alpha$.

The upper contact 912 may be stationary, may be retractable and biased inwards (e.g., using a spring), and/or may be selectively extended into contact with the tubular 903 upon a determination (e.g., using the first proximity detection system) that a lower connection 913 of the upper tubular 903 has passed the upper contact 912. However, as shown, the magnetic flux $\phi$ may additionally or instead travel between the BOP body 901 and the tubular 903 and the drill string 314 away from the pipe ram 354 and/or the upper contact 912.

The gap 914 may be present between the tubular 903 and the drill string 314, prior to contact therebetween. The magnetic reluctance of the magnetic circuit illustrated may at least partially depend on the size of the gap 914. Thus, decreasing the size of the gap 914 may decrease the magnetic reluctance, thereby increasing the magnitude of the magnetic flux $\phi$ along the tubular 903 and the drill string 314.

By using antennae 904, 906, 908, the increase of AC magnetic flux may be detected. Different embodiments may be developed to detect the change of magnetic flux $\phi$. For example, the antennae 902 and 906 may be used. The antenna 902 may be used as a transmitter driven by AC current, while the antenna 906 may be the receiver to detect the AC flux as output voltage determined by the equation (4).

In another embodiment, the antennae 902 and 904 may be used. The antenna 902 may be used of transmitter driven by AC current, while the antenna 904 may be the receiver to detect the AC flux as output voltage determined by the formula (4). When the gap 914 reduces the total AC magnetic flux increases and the output voltage of antennae 902, 904 also increases.

In another embodiment, a single antenna is being used (e.g., antenna 902). This antenna 902 is considered an inductor of variable inductance as the gap 914 is varied. When the gap 914 is reduced, the inductance is increased. The antenna 902 is driven by an AC current of known value, the voltage at the terminal of the antenna 902 is measured. Inductance can then be calculated. From the determined inductance, the gap 914 distance may be calculated, either by using the information of a calibration table, or by using a model of the inductance versus the gap 914.

A controller 910 may be associated to insure the determination of the gap 914. This controller 910 may include an analog filter, an analog-to-digital converter (ADC), and a processor with memory. This controller 910 is shown associated with the antenna 906 in FIG. 9A.

Figure 10A:
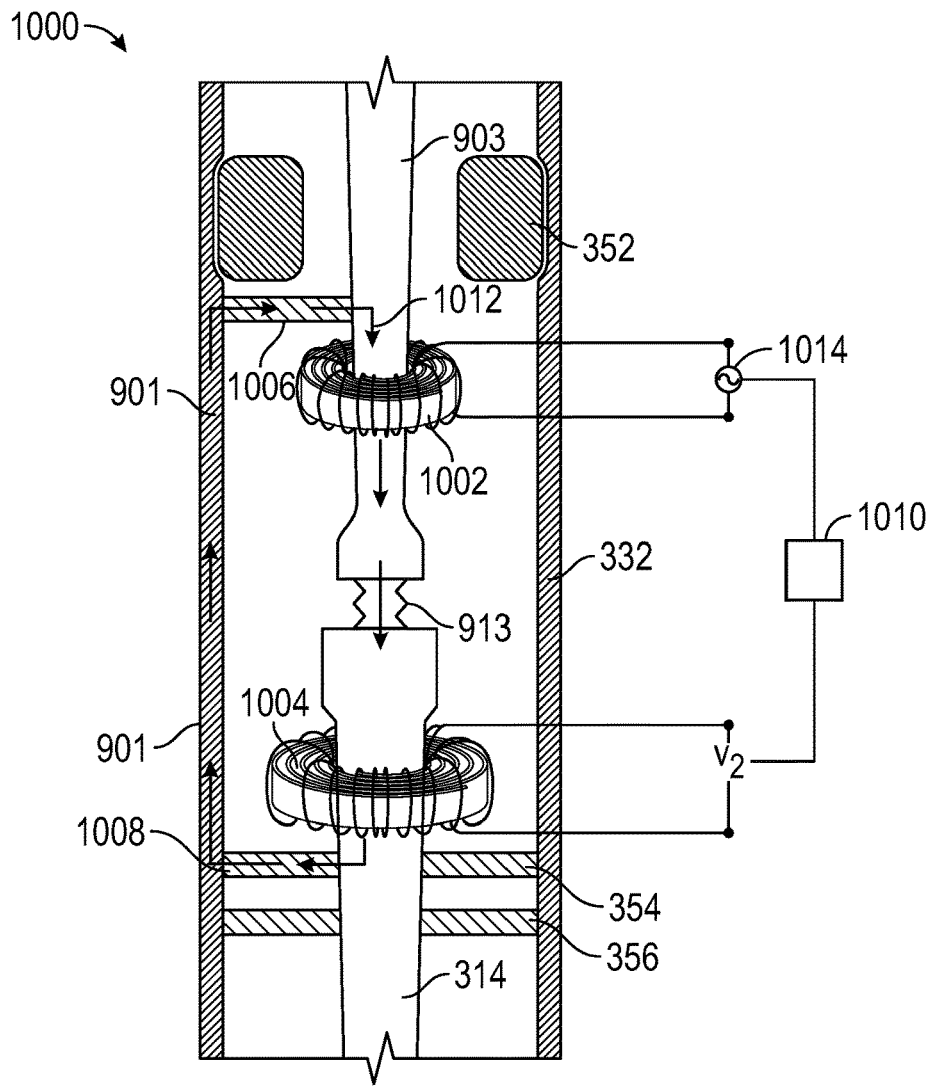
FIG. 10A illustrates a schematic view of a contact detection system within a blowout preventer, according to an embodiment.

In some embodiments, it may be useful to know the instant at which contact between the upper tubular 903 and the drill string 314 is made. Accordingly, FIG. 10A illustrates a schematic view of a third proximity detection system 1000, which may determine when contact between the upper tubular 903 and the drill string 314 is made. The rig control system 100 (FIG. 1) may use this knowledge to stop the advance of the top drive 304 and then to begin rotation to make the connection while ensuring the axial displacement of the top in relation with the connection thread pitch.

Figure 10B:
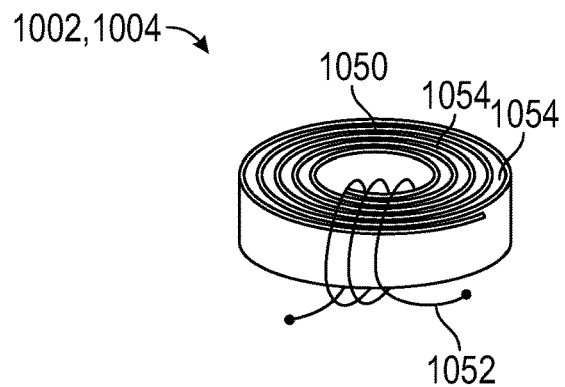
FIG. 10B illustrates a schematic view of an antenna of the contact detection system, according to an embodiment.

In an embodiment, the third proximity detection system 1000 may employ the upper tubular 903 and the drill string 314 as contacts in an electrical circuit. Further, the system 1000 may include a set of one or more antennae (two antennae are shown: 1002, 1004), which may each include a ferromagnetic core 1050 and a wire coil 1052 wrapped around the core 1050, as shown in FIG. 10B. The core 1050 may include multiple laminated ferromagnetic sections 1054. Thus, when a current is provided to the coil 1052, it may generate a magnetic flux in the core 1050, and, in reverse, when a magnetic flux is generated in the core 1050, a voltage may be generated in the coil 1052, based on equation (4). The output voltage is influenced by the impedance of the measurement circuit, so that a current may be delivered in this measurement system. In some case, the impedance of the measurement system is low and the measurement is performed as current.

Referring again to FIG. 10A, the antennae 1002, 1004 may be spaced apart from one another within the BOP body 901. Further, the antennae 1002, 1004 may be positioned within the wall of the BOP body 901, or may be elsewhere within the BOP 332. The antenna 1002 may be positioned, around the tubular 320 as it is advanced toward the drill string 314, while the antenna 1004 may be positioned around the drill string 314 as it is held by the pipe ram 354. In some embodiments, the antenna 1002 may be within the RCD 330 (FIG. 3).

The system 1000 may also include a first contact 1006 and a second contact 1008. The first contact 1006 may extend inward into engagement with the tubular 903. Accordingly, the first contact 1006 may be a static structure, a retractable structure, etc. The first contact 1006 may be coupled to the BOP body 901, and may be positioned such that it makes electrical contact with the upper tubular 903 above the antenna 1002, at least when the tubular 903 is connected to the drill string 314. The second contact 1008 may be provided by the pipe ram 354, or another, separate structure capable of conducting electrical current. In some embodiments, the second contact 1008 may be active, while the first contact 1006 may not be.

An AC current may be generated by an AC source 1014 and passed through the coil 1052. In this configuration, the antenna 1002 may act as a "primary winding" in a transformer, and the tubular 903 may act as a "secondary winding", e.g., with a single turn. Thus, the current passed through the coil 1052 may generate a flux in the core 1050, which in turn may generate a current in the upper tubular 903 when there is a complete circuit for the current to flow, i.e., when contact between the upper tubular 903 and the drill string 314 is made.

The antenna 1004 may act as a sensor, serving to detect current in the drill string 314. The antenna 1004 may thus acts as a secondary winding, generating current in its coil 1052 when a current is passed through the drill string 314, which serves as the primary winding. Until the lower connection 913 of the upper tubular 903 contacts the drill string 314, there may be no current within the drill string 314, and thus no current in the antenna 1004.

When the lower connection 913 makes contact with the drill string 314, the current generated by the antenna 1002 may be transmitted through the upper tubular 903, the drill string 314, the first contact 1006 (e.g., the pipe ram 354), the BOP body 901, the second contact 1008, and back into the upper tubular 903, thereby providing a complete circuit, generating a voltage V2 in the antenna 1004.

A controller 1010, which may be part of the rig control system 100, may monitor one or both of the antennae 1002, 1004. For example, the controller 1010 may signal the AC current generator 1014 to generate a current in the antenna 1002. This may be in response to the controller 1010, or another controller, determining that the upper tubular 903 is in proximity to the drill string 314, e.g., using the first or second proximity detection systems described above. The controller 1010 may also monitor the voltage V2 across the antenna 1004, which may increase when contact between the upper tubular 903 and the drill string 314 is made. In turn, the controller 1010 may signal the rig control system 100 to stop lowering the top drive 304 when contact is detected, so as to avoid damaging either the upper tubular 903 or the drill string 314.

It should be noted that the antenna 1004 may be placed on the same tubular than antenna 1002. The current in the tubular can only established properly when there is a continuous current path thanks to the contact between the upper tubular 903 and the drill string 314. With such embodiment, the 2 coils can be around the upper tubular 903 (but below the upper contact 1006; or they both can around the upper part of the drill string 314 (above the ram 354). In another embodiment, a single antenna with core may be used for the detection of the gap. In such case, the impedance of the antenna with core is measured. The impedance may increase when the gap is closed and current establishes in the tubular.

Figure 10C:
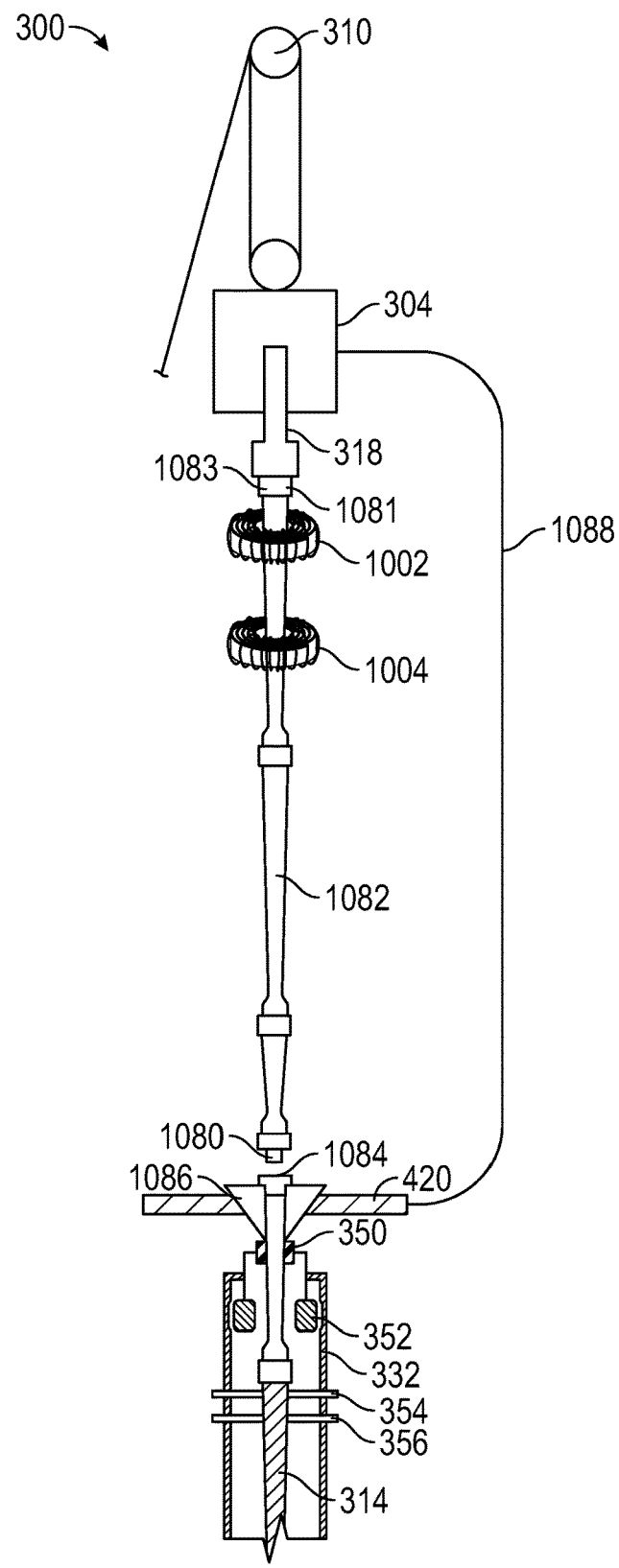
FIG. 10C illustrates a schematic view of the drilling system including an implementation of the contact detection system positioned proximal to the top drive of the drilling system, according to an embodiment.

FIG. 10C illustrates a side, schematic view of the drilling system 300, in which the third proximity detection system 1000 is located at an elevated position above the rig floor 420, according to an embodiment. In this embodiment, the proximity detection system 1000 may be configured to determine the proximity of a lower connection 1080 of a stand 1082 of tubulars suspended from the top drive 304 to an upper connection 1084 of the drill string 314 held in a slips 1086 at the rig floor 420. In another embodiment, the proximity detection system 1000 may be configured to determine the proximity of a lower connection 1081 of the top drive 304 to an upper connection 1083 of the new stand 1082. As with the embodiments of FIGS. 10A and 10B, the proximity detection system 1000 may include the two antennae 1002, 1004, either of which may generate or detect current in the stand 1082. The antennae 1002, 1004 in this embodiment may be located above the rig floor 420, e.g., near the top of the mast, but below the top drive 304.

The stand 1082 (in this case, a stand of three tubular segments— i.e., a "triple") may hang below the top drive 304, through the antennae 1002, 1004. The top drive 304 is grounded to the rig floor 420 by a grounding connection 1088, which may be a specific grounding cable or the metal path provided by the rig floor, the mast, the draw-work cable (not shown), the travelling block, and the crown block. The antennae 1002, 1004 may operate as in the previous embodiment. Accordingly, the antenna 1004 detects the current in the stand 1082 when contact has been established between the lower connection 1080 of the stand 1082 and the upper connection 1084 of the drill string 314. This contact may close the current loop with the grounding connection 1088, thereby allowing current to proceed through the system 300 and be detected by one of the antennae 1002, 1004. It will be appreciated that the coils of the second proximity detection system 900 may also be positioned at an elevation above the rig floor 420, so as to function similarly.

Figure 10D:
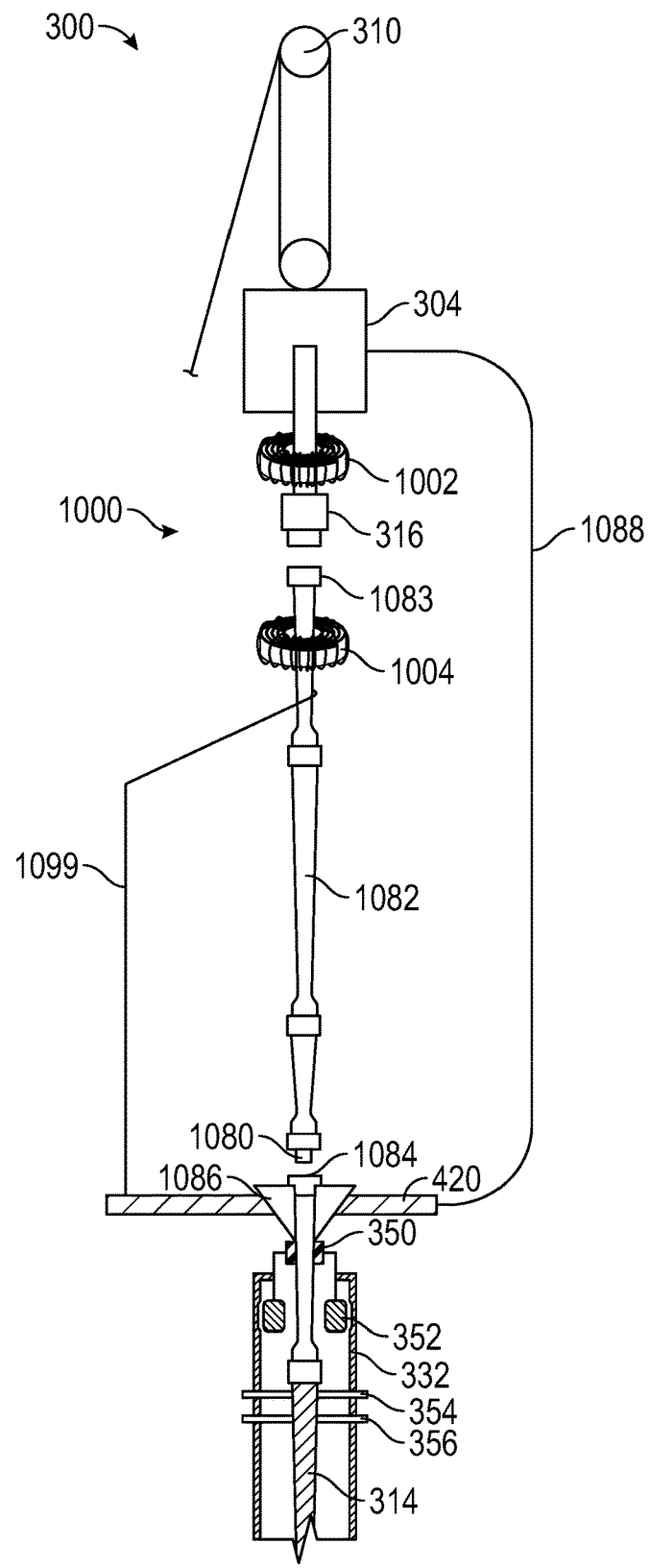
FIG. 10D illustrates a schematic view of the drilling system including another implementation of the contact detection system positioned proximal to the top drive of the drilling system, according to an embodiment.

FIG. 10D illustrates a side, schematic view of the drilling system 300, in which the third proximity detection system 1000 is again located at an elevated positioned above the rig floor 420, according to an embodiment. In this embodiment, the proximity detection system 1000 may be configured to determine the proximity of the quill shaft 316 to the upper connection 1083 of the new stand 1082. The antennae 1002, 1004 in this embodiment may be located above the rig floor 420, e.g., near the top of the mast, but below the top drive 304.

The stand 1082 (in this case, a stand of three tubular segments— i.e., a "triple") may be supported between the quill shaft 316 and the drill string 314 (held in slips 1086) by a pipe handler 1099, which also serves the ground the new stand 1082. The top drive 304 is grounded to the rig floor 420 by a grounding connection 1088, which may be a specific grounding cable or the metal path provided by the rig floor, the mast, the draw-work cable (not shown), the travelling block, and the crown block. The antennae 1002, 1004 may operate as in the previous embodiment. Accordingly, the antenna 1004 detects the current in the stand 1082 when contact has been established between the quill shaft 316 and the new stand 1082. This contact may close the current loop with the grounding connection 1088 and the pipe handler 1099, thereby allowing current to proceed through the system 300 and be detected by one of the antennae 1002, 1004. It will be appreciated that the coils of the second proximity detection system 900 may also be positioned at an elevation above the rig floor 420, so as to function similarly.

Figure 11A:
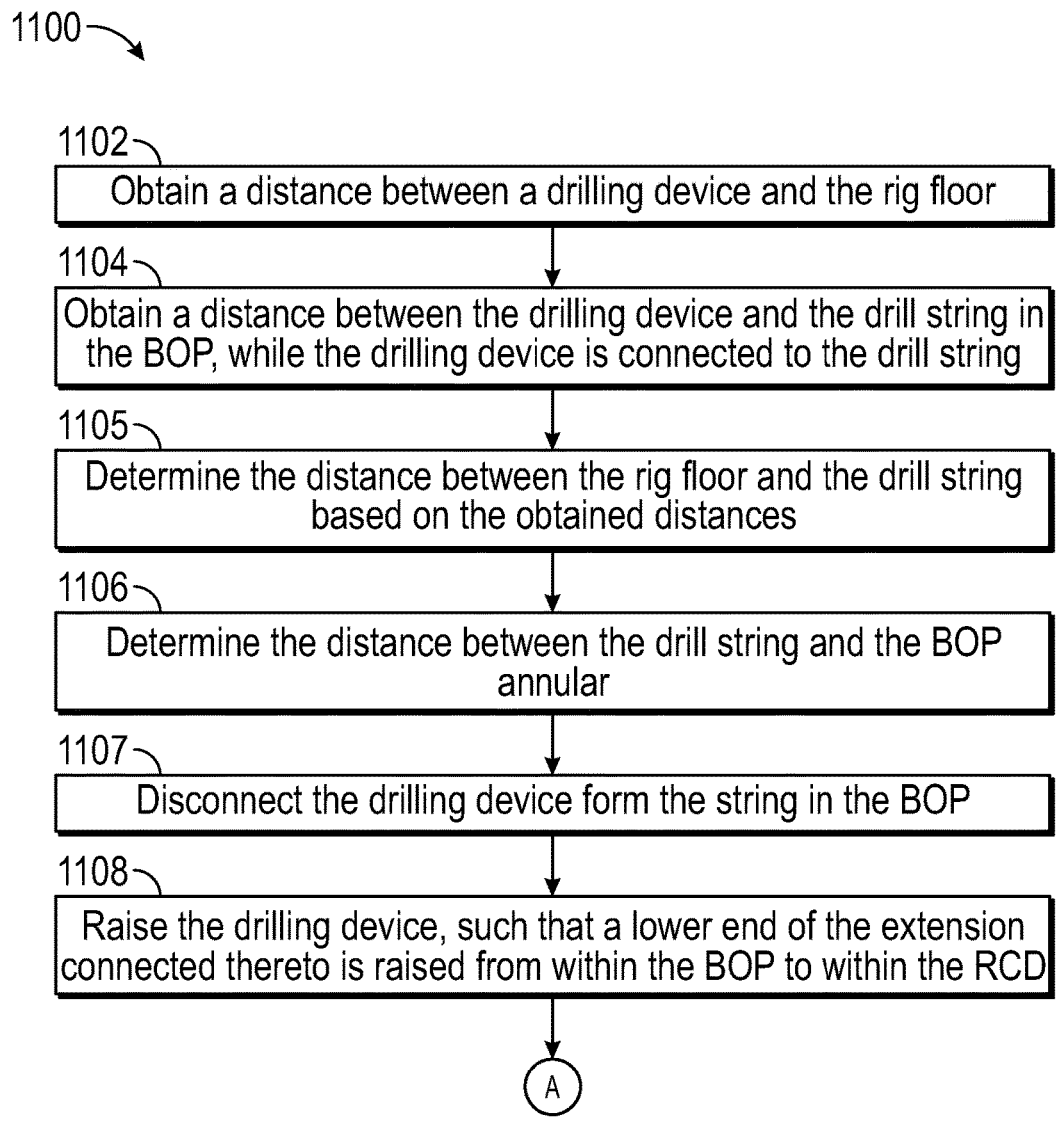
FIGS. 11A, 11B, and 11C illustrate a flowchart of a method for connecting tubulars beneath the rig floor, according to an embodiment.
Figure 11B:
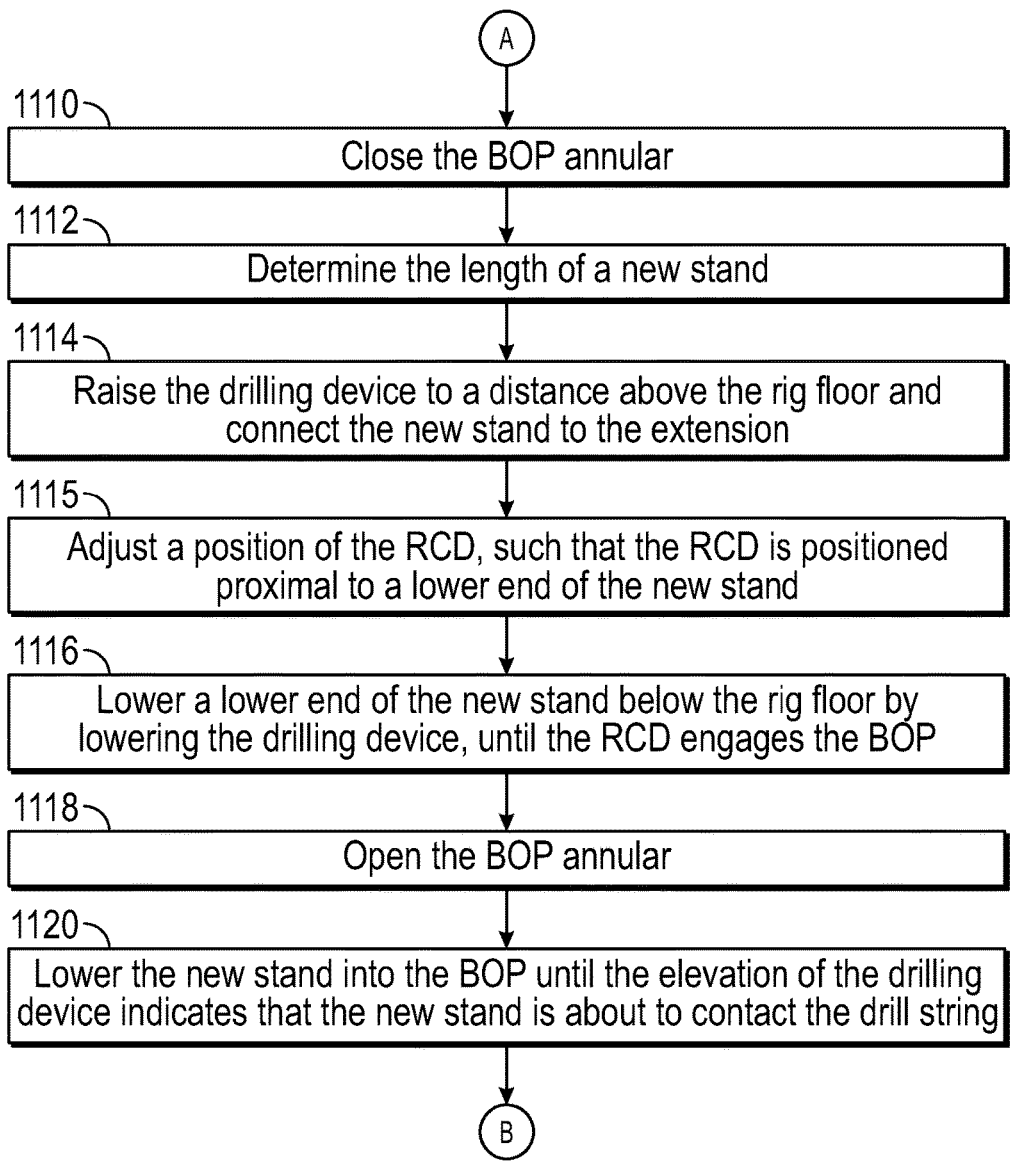
Figure 11C:
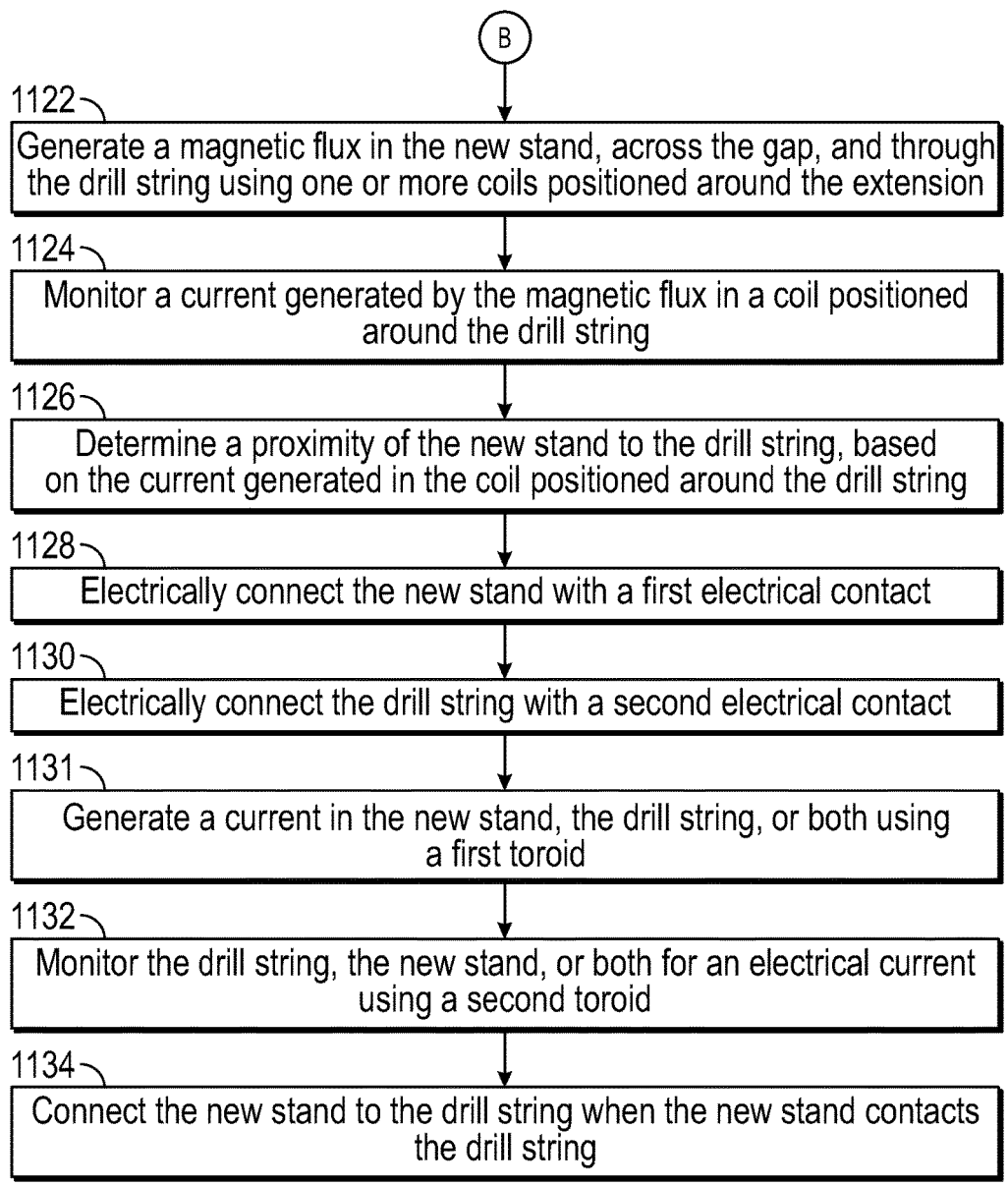

FIGS. 11A-C illustrate a flowchart of a method 1100 for connecting a tubular (e.g., the extension 320) and the drill string 314 within a BOP 332, according to an embodiment. The method 1100 is described herein with reference to tripping-in; however, as will be explained below, it may be employed and/or modified for tripping-out.

At the onset of the method 1100, the drill string 314 is supported by the pipe ram 354, below the rig floor 420. Further, the extension 320 may be connected to the drill string 314, as shown in FIG. 4. The method 1100 may begin by obtaining a distance D3 between a drilling device (e.g., the top drive 304) and the rig floor 420, as at 1102. The distance D3 may be obtained by a sensor configured to measure the elevation of the top drive 304, such as an encoder in the drawworks 306. In particular, this distance D3 may be the distance from the bottom of the quill shaft 316 to the rig floor 420.

The method 1100 may further include obtaining a distance D2 between the drilling device and the drill string 314 in the BOP 332, while the drilling device is connected to the drill string 314 (e.g., via an intermediate tubular, such as the extension 320), as at 1104. This distance D2 may be provided by the length of the extension 320. The method 1100 may also include determining the distance D4 between the rig floor 420 and the drill string 314 based on the distances D3 and D2 (e.g., D4=D2−D3), as at 1105. Further, the method 1100 may include determining the distance D7 between the drill string 314 and the BOP annular 352, as at 1106, which may be determined based on the distance D4 between the rig floor 420 and the drill string 314, the distance D8 between the rig floor 420 and the BOP annular 352.

The method 1100 may then proceed to disconnecting the drilling device from the drill string 314, as at 1107, e.g., by rotating the quill shaft 316 of the drilling device and thereby disconnecting the extension 320 from the drill string 314. Such rotation may be performed by the usage of an iron-roughneck above the rig floor so that the connection between the extension 320 and the drill string 314 is separated (parted) while the connection between the top drive quill shaft 316 and the extension 320 may not be affected. The method 1100 may also include raising the drilling device, such that the lower end of the extension 320 connected thereto is raised from within the BOP 332 to within the RCD 330, as at 1108. For example, the drilling device may be raised by at least the distance D7, representing the distance between the BOP annular 352 and the drill string 314. The lower end of the extension 320 may extend past the RCD 330 (i.e., where the RCD 330 attaches to the BOP 332) by the sixth distance D6, as explained above.

The method 1100 may then proceed to closing the BOP annular 352, as at 1110. This may seal the well, allowing the method 1100 to continue raising the drilling device, which may include or cause the RCD 330 to be disconnected from the BOP 332.

The method 1100 may include determining the length of the new stand 458 (the ninth distance D9), as at 1112. The method 1100 may also include raising the drilling device to a distance above the rig floor 420, so as to allow the new stand 458 to be received therebetween, and then connecting the new stand 458 to the extension 320, as at 1114. The method 1100 may also include adjusting a position of the RCD 330, such that it is positioned proximal to a lower end of the new stand 458, as at 1115. For example, the lower end of the new stand 458 may extend past the RCD 330 by the distance D6, which may be greater than the distance D6 that the RCD 330 extended past the extension 320.

The method 1100 may then include lowering the lower end of the new stand 458 below the rig floor 420 by lowering the drilling device, as at 1116. The drilling device may be lowered at least until the RCD 330 has coupled with or otherwise engages the BOP 332, which may be determined based on the elevation of the drilling device. For example, the distance D3 at which this occurs may be the distance D3 determined at 1102, plus the distance D9 (length of the new stand 458), minus the distance D1 (distance from the rig floor 420 to the interface between the BOP 332 and the RCD 330).

The method 1100 may then include opening the BOP annular 352, as at 1118, and lowering the new stand 458 until the new stand 458 is about to contact (or, alternatively, is in engagement with) the drill string 314, which may be determined based on the elevation of the drilling device (the distance D3), as at 1120. The distance D3 at which this occurs may be at least the original distance D3 determined at 1102, plus the distance D9, minus the distance D4. The actual elevation (distance D3) that may cause the rig control system 100 to stop lowering the drill string may be greater than this new distance D3, i.e., slightly higher elevation than what would cause engagement with the drill string 314, to avoid an impact between the new stand 458 and the drill string 314.

The method 1100 may then proceed to employing the second proximity detection system 900, according to an embodiment. Thus, the method 1100 may include generating a magnetic flux in the extension 320, across the gap 914, and through the drill string 314, e.g., via one or more of the antennae 902, 904 positioned around the extension 320, as at 1122. The method 1100 may also include monitoring a signal generated in the antenna 906 positioned around the drill string 314, as at 1124. The signal at the antenna 906 may be a voltage is the impedance of the measurement system is high. The method 1100 may include determining a proximity of the extension 320 to the drill string 314 (e.g., a size of the gap 914), based on the signal generated in the antenna 906, as at 1126.

The method 1100 may additionally include employing the third proximity (or "contact") detection system 1000. This may include electrically connecting (e.g., contacting) the new stand 458 with a first electrical contact 1006, as at 1128. The method 1100 may also include electrically connecting (e.g., contacting) the drill string 314 with a second electrical contact 1008, which may be provided by the pipe ram 354, as at 1130. The method 1100 may further include applying an electrical current to a antenna 1002 positioned around the new stand 458 or the drill string 314, so as to generate an electrical current in the new stand 458, the drill string 314, as at 1131. The method 1100 may further include positioning a second antenna 1004 around the new stand 458 or the drill string 314, so as to monitor the drill string 314, the new stand 458, or both for an electrical current, as at 1132.

In the case of operation with where the connection between the upper tubular 903 and the drill-string is submerged in conductive fluid such as water-based-mud, the contact 1006 and 1008 may not be required as the return current path normally defined by the contact 1008, the BOP body 901 and the upper contact 1006 is partially by-passed by current leakage into the fluid contained inside the BOP 901. In such condition, the detection method may operate without the contacts 1008 and 1006 thanks to the by-passing current within the conductive fluid, When the gap 914 is closed, and the new stand 458 touches the drills string 314, a circuit including the BOP body 901, the contact 1006, the new stand 458, the drill string 314, and the second contact 1008 may be completed. The current generated, e.g., in the new stand 458, by the antenna 1002 may flow through this circuit, and the antenna 1004 may detect the flow of such current, thereby indicating that contact between the new stand 458 and the drill string 314 is made. Once contact is determined, the drilling device, or another tool, may be employed to connect the new stand 458 to the drill string 314, as at 1150, e.g., by rotating the new stand 458 while ensuring a slow downward movement corresponding to the pitch of the thread to engagement. Once connected, the new stand 458 becomes part of the drill string 314. The drill string 314 may thus be lowered until it is desired to add another new stand, whereupon the method 1100 may begin again.

Figure 12:
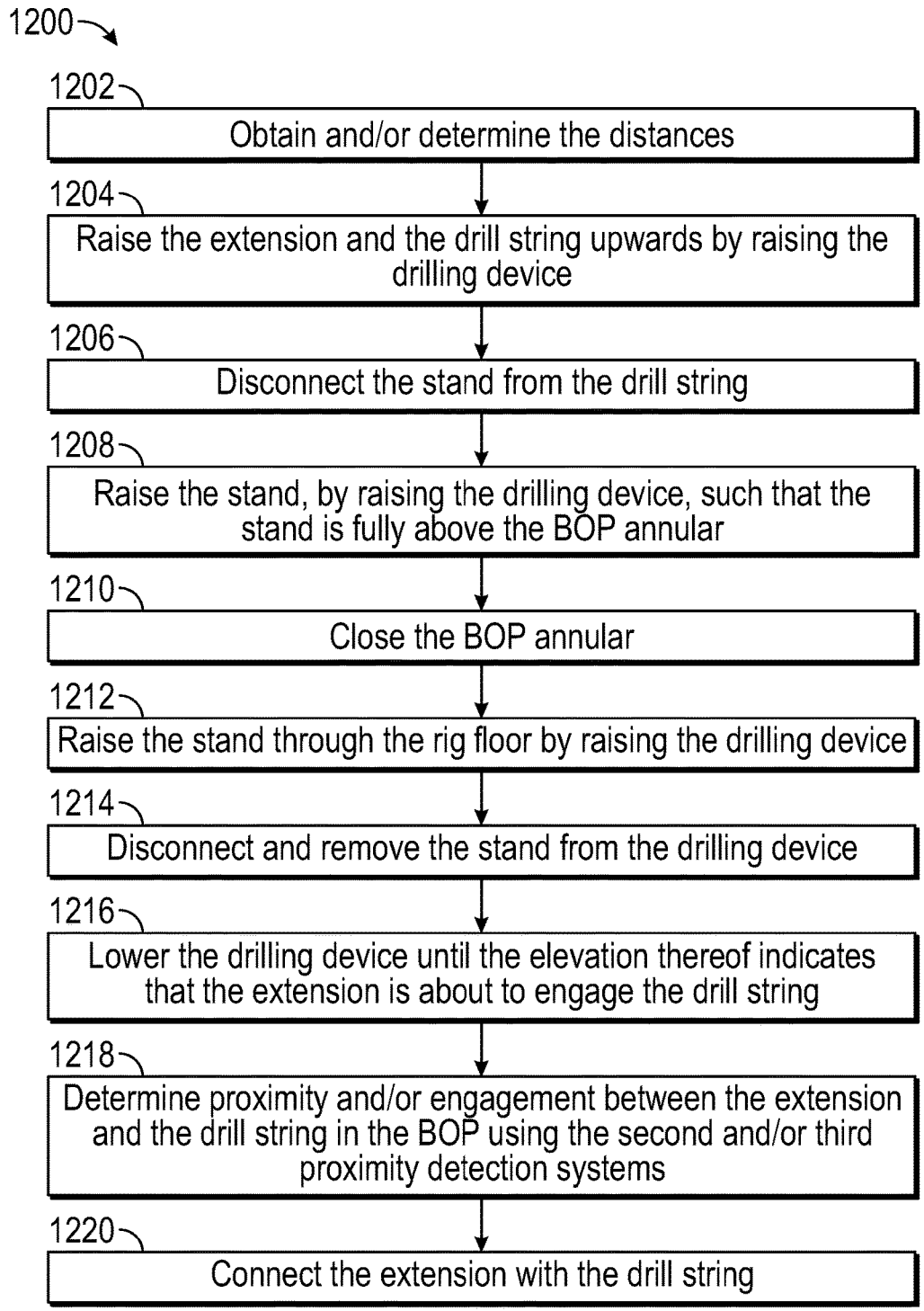
FIG. 12 illustrates a flowchart of another method for connecting tubulars beneath the rig floor, according to an embodiment.

It will be appreciated that the method 1100 may be executed in similar fashion for tripping out operations, i.e., for removing sequential stands 458 from the drill string 314. For example, FIG. 12 illustrates a flowchart of another method 1200 for connecting a tubular (e.g., the extension 320) with the drill string 314 within the BOP 332, according to an embodiment. The method 1200 may start in a similar configuration as that shown in FIG. 4, with the extension 320 coupled to the drill string 314.

The method 1200 may include obtaining and determining at least some of the same distances D1–D9, as at 1202, as described above. The drilling device may then be employed to raise the extension 320 and the drill string 314 upwards, e.g., by the length (distance D9) of the uppermost stand 458, as at 1204. The method 1200 may then include disconnecting the stand 458 from the drill string 314, as at 1206. The drilling device may then raise the stand 458 such that it is above the BOP annular 352 (distance D7), as at 1208, the BOP annular 352 may be closed, as at 1210, and the drilling device may then be employed to further raise the stand 458, e.g., such that the stand 458 is fully above the rig floor 420, as at 1212.

The stand 458 may then be disconnected from the extension 320 and removed, as at 1214. The extension 320 may then be lowered, by lowering the drilling device, until the distance D3 indicates that the extension 320 is about to engage the drill string 314, e.g., as part of the first proximity detection system, as at 1216. The second and/or third proximity detection systems 900, 1000 may then be employed to more precisely determine proximity and/or engagement between the extension 320 and the drill string 314, as at 1218. The extension 320 may then be connected with the drill string 314, as at 1220, and the method 1200 may start again.

FIG. 13 illustrates a flowchart of a method 1300 for connecting a new stand of tubulars to a drilling device, according to an embodiment. In this method 1300, the second and third proximity detection systems 900, 1000 may be located near the top of the mast, e.g., such that they reside below the top drive 304 where it is raised to receive the new stand 1082, as shown in FIG. 10C.

The method 1300 may begin by obtaining a first distance (elevation) between a lower connection 1080 of the drilling device and the rig floor 420, as at 1302. The lower connection 1080 may be part of a first tubular of the drilling device (e.g., top drive 304), for example, the quill shaft 316 or an extension (e.g., the extension 320) connected thereto.

The method 1300 may then include determining a length of a new stand 1082 of tubulars (e.g., a "second" tubular), as at 1304. The method 1300 may then include determining a second distance between an upper connection 1081 of the new stand 1082 and the rig floor 420, as at 1306. The first distance (elevation of the top drive 304) is greater than the second distance (i.e., length of the new stand 1082 plus its elevation above the rig floor 420), such that the new stand 1082 may be received between the rig floor 420 and the top drive 304.

The method 1300 may then proceed to employing the first proximity detection system, e.g., based on the height of the top drive 304. Accordingly, the method 1300 may include lowering the drilling device until the first distance approaches the second distance, as at 1308. This may be determined based on a lower threshold for the difference between the first and second distances. In another embodiment, it may be based on operation of the second proximity detection system.

Accordingly, the method 1300 may include generating a magnetic flux in the tubular of the drilling device, as at 1310, and monitoring a current in the new stand 1082 generated by the magnetic flux, as at 1312. This may be conducted by operation of the second proximity detection system, by which the gap between the tubulars may be determined based on the current generated by the magnetic flux across the gap. The method 1300 may then continue to lower the drilling device, while monitoring the current.

The method 1300 may also include electrically connecting the tubular (e.g., the shaft 316 and/or the extension 320) of the top drive 304 with a first contact, as at 1316 and electrically connecting the new stand 1082 with a second contact, as at 1318. This may proceed by operation of the third proximity (contact) detection system. As the top drive 304 is lowered (and/or the new stand 1082 is raised), eventually, the lower connection 1060 may touch the upper connection 1083, completing an electrical circuit and producing measurable current in the top drive 304 and/or in the new stand 1082. Once connection is made, relative rotation may be imparted to connect together the two tubulars.

It will be appreciated that this same general method may be employed to connect together any two ferrous tubulars, e.g., in the oilfield context. This may be particularly useful where a human operator viewing the connection process may present challenges, as it may provide several levels of accuracy for the drilling system 300 to gently bring the two tubulars together for connection. In some embodiments, the method may be employed at the rig floor 420, e.g., without regard to challenges to visibility. For example, the coils/second antennae of the second and third proximity detection systems may be provided by the iron roughneck to assist in stabbing the pin end of a new stand into the box end of the drill string while it is supported in slips. The slips, pipe handler, and pipe ram/tubular lock of the present disclosure are all examples of a "support device" which may be anything configured to hold a tubular.

Figure 14:
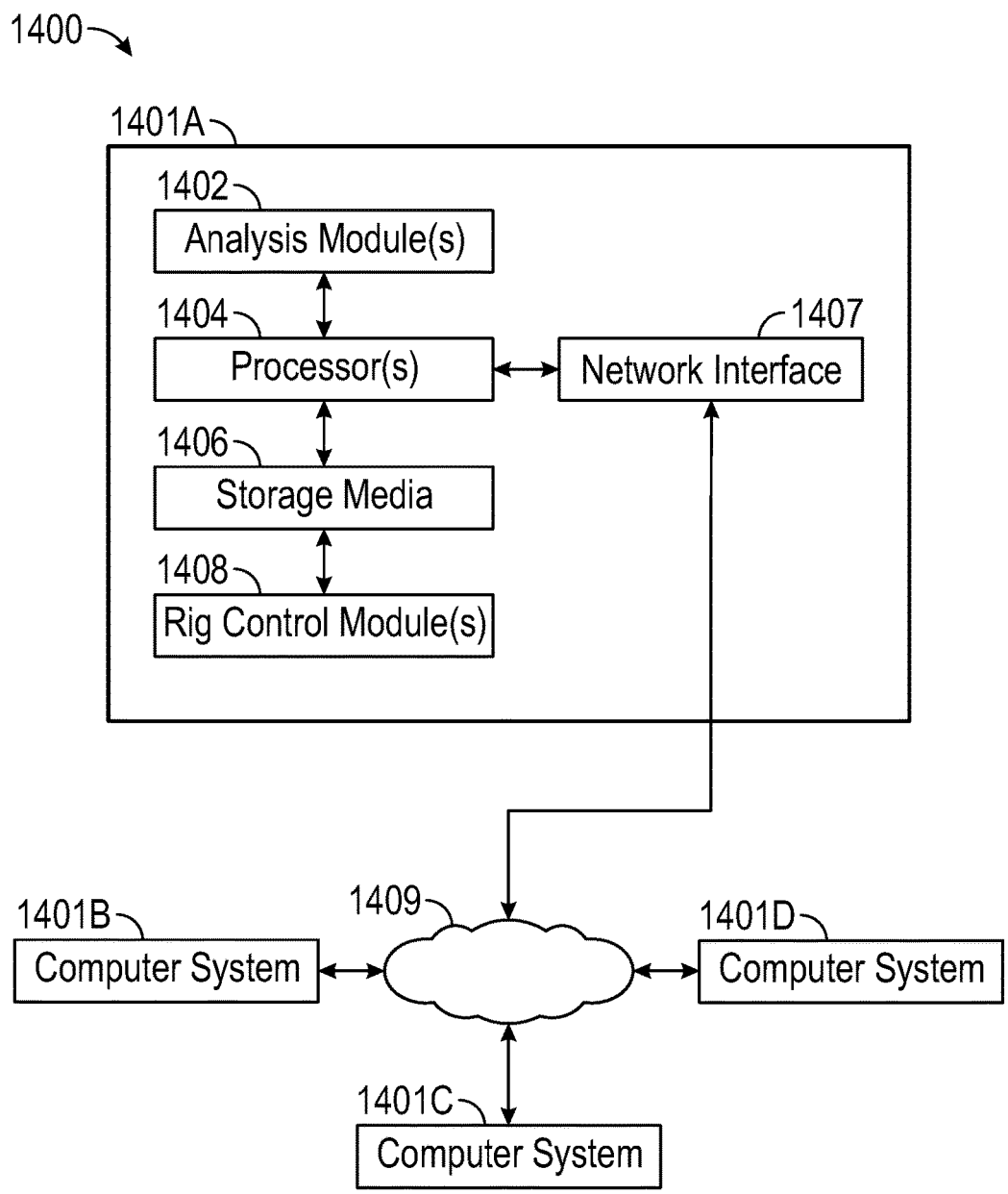
FIG. 14 illustrates a schematic view of a computing system, according to an embodiment.

In some embodiments, the methods of the present disclosure may be executed by a computing system. FIG. 14 illustrates an example of such a computing system 1400, in accordance with some embodiments. The computing system 1400 may include a computer or computer system 1401A, which may be an individual computer system 1401A or an arrangement of distributed computer systems. The computer system 1401A includes one or more analysis modules 1402 that are configured to perform various tasks according to some embodiments, such as one or more methods disclosed herein. To perform these various tasks, the analysis module 1402 executes independently, or in coordination with, one or more processors 1404, which is (or are) connected to one or more storage media 1406. The processor(s) 1404 is (or are) also connected to a network interface 1407 to allow the computer system 1401A to communicate over a data network 1409 with one or more additional computer systems and/or computing systems, such as 1401B, 1401C, and/or 1401D (note that computer systems 1401B, 1401C and/or 1401D may or may not share the same architecture as computer system 1401A, and may be located in different physical locations, e.g., computer systems 1401A and 1401B may be located in a processing facility, while in communication with one or more computer systems such as 1401C and/or 1401D that are located in one or more data centers, and/or located in varying countries on different continents).

A processor may include a microprocessor, microcontroller, processor module or subsystem, programmable integrated circuit, programmable gate array, or another control or computing device.

The storage media 1406 may be implemented as one or more computer-readable or machine-readable storage media. Note that while in the example embodiment of FIG. 14 storage media 1406 is depicted as within computer system 1401A, in some embodiments, storage media 1406 may be distributed within and/or across multiple internal and/or external enclosures of computing system 1401A and/or additional computing systems. Storage media 1406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1400 contains one or more sensor control module(s) 1408. In the example of computing system 1400, computer system 1401A includes the sensor control module 1408. In some embodiments, a single sensor control module may be used to perform some or all aspects of one or more embodiments of the methods disclosed herein. In alternate embodiments, a plurality of sensor control modules may be used to perform some or all aspects of methods herein.

It should be appreciated that computing system 1400 is only one example of a computing system, and that computing system 1400 may have more or fewer components than shown, may combine additional components not depicted in the example embodiment of FIG. 14, and/or computing system 1400 may have a different configuration or arrangement of the components depicted in FIG. 14. The various components shown in FIG. 14 may be implemented in hardware, software, or a combination of both hardware and software, including one or more signal processing and/or application specific integrated circuits.

Further, the actions in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain at least some of the principals of the disclosure and their practical applications, to thereby enable others skilled in the art to utilize the disclosed methods and systems and various embodiments with various modifications as are suited to the particular use contemplated.

What is claimed is:

1. A method for connecting tubulars, comprising:
   determining an elevation of a drilling device above a rig floor;
   lowering a first tubular connected to the drilling device toward a second tubular by lowering the drilling device;
   determining that the first tubular is in proximity to the second tubular based at least in part on an elevation of the drilling device;
   determining that the first tubular is in proximity to the second tubular based at least in part on a magnetic flux or an electrical current applied to the first tubular, the second tubular, or both;
   connecting the first and second tubulars together; and
   supporting the second tubular below the rig floor, wherein lowering the first tubular comprises lowering the first tubular at least partially through the rig floor, wherein the second tubular comprises a drill string, and wherein supporting the second tubular below the rig floor comprises supporting the drill string within a blowout preventer, the method further comprising:
   determining that a rotating control device positioned around the first tubular has coupled to the blowout preventer while lowering the first tubular, based at least partially on the elevation of the drilling device; and
   opening a seal of the blowout preventer after determining that the rotating control device has coupled to the blowout preventer.

2. The method of claim 1, wherein the first tubular comprises an extension that is connected to the drilling device, the method further comprising:
   releasing the drill string from being supported below the rig floor, such that the drill string is supported by the drilling device;
   lifting the extension and the drill string by raising the drilling device; and
   disconnecting a stand of one or more drill pipes from the drill string, wherein supporting the tubular below the rig floor comprises engaging the drill string prior to disconnecting the stand.

3. The method of claim 1 further comprising determining a distance between the drill string and a rig floor when the drilling device is connected to the drill string below the rig floor, based on the elevation of the drilling device.

4. The method of claim 3, wherein the second tubular comprises a stand of one or more drill pipes and the first tubular comprises an extension that is connectable to the drill string, the method further comprising:
   disconnecting the extension from the drill string;
   lifting the extension to a position above the seal of the blowout preventer;
   closing the seal of the blowout preventer;

lifting the extension such that the rotating control device is decoupled from the blowout preventer, after closing the seal of the blowout preventer; and connecting the stand to the extension, wherein lowering the tubular comprises lowering the stand after connecting the stand to the extension.

5. The method of claim 4, further comprising determining a distance between the drill string and the seal of the blowout preventer, wherein lifting the extension to the position above the seal of the blowout preventer comprises raising the drilling device by at least the distance between the drill string and the seal of the blowout preventer.

6. The method of claim 4, further comprising moving the rotating control device to a lower end of the stand, after connecting the stand to the extension, such that the rotating control device extends lower than the lower end of the stand.

7. A drilling system, comprising:
a rig floor;
a drilling device that is movable vertically with respect to the rig floor;
 a first proximity detection system configured to determine a proximity of a first tubular coupled to the drilling device to a second tubular based on an elevation of the drilling device above the rig floor;
a second proximity detection system configured to further determine the proximity of the first tubular to the second tubular based on a magnetic flux generated in the first tubular, the second tubular, or both; and
 a third proximity detection system configured to further determine the proximity of the first tubular to the second tubular, wherein the third proximity detection system detects when the first tubular contacts the second tubular based on a current applied to the first tubular or the second tubular.

8. The drilling system of claim 7, further comprising a blowout preventer defining a sealable chamber therein, the first, second, and third proximity detection systems are configured to detect the proximity between the first and second tubulars when the second tubular is in the sealable chamber.

9. The drilling system of claim 8, wherein the second tubular comprises a drill string.

10. The drilling system of claim 7, wherein the third proximity detection system comprises:
 a first antenna configured to be positioned around the first tubular when the tubular is lowered towards the second tubular, the first antenna being configured to generate a current in the first tubular; and
 a second antenna configured to be positioned around the second tubular, the second antenna being configured to generate an electrical current in response to a current passing from the tubular to the second tubular.

11. The drilling system of claim 10, wherein the first antenna and the second antenna each comprise a laminated ferromagnetic core and a coil wound around the core.

12. A drilling system, comprising:
a rig floor;
a drilling device that is movable vertically with respect to the rig floor;
 a first proximity detection system configured to determine a proximity of a first tubular coupled to the drilling device to a second tubular based on an elevation of the drilling device above the rig floor; and
a second proximity detection system configured to further determine the proximity of the first tubular to the second tubular based on a magnetic flux generated in the first tubular, the second tubular, or both, wherein the second proximity detection system comprises:
 a first antenna configured to be positioned around the tubular when the tubular is lowered toward the drill string, wherein a magnetic flux is generated in the tubular when an electrical current is passed through the first winding; and
 a second antenna configured to be positioned around the drill string, wherein the second winding is configured to generate a current in response to the magnetic flux, the current generated in response to the magnetic flux varying based on a distance between the tubular and the drill string.

13. An apparatus for connecting together two tubulars in a drilling system, the apparatus comprising:
 a drilling device configured to rotate a first tubular;
 a support device configured to support a second tubular, wherein the drilling device is configured to lower the first tubular toward the second tubular, and then to rotate the first tubular with respect to the second tubular, to connect the first and second tubulars together;
 a first proximity detection system configured to determine a proximity of the first tubular to the second tubular based on an elevation of the drilling device;
 a second proximity detection system configured to determine the proximity of the first tubular to the second tubular based on a magnetic flux in the first tubular, the second tubular, or both; and
 a third proximity detection system configured to determine that the first tubular has engaged the second tubular based on an electrical current in the first tubular, the second tubular, or both.

* * * * *